US00RE50516E

(19) United States
(12) Reissued Patent
Jones et al.

(10) Patent Number: US RE50,516 E
(45) Date of Reissued Patent: Aug. 5, 2025

(54) LIGHTING SYSTEM FOR SUSPENDED CEILING

(71) Applicant: USAI, LLC, New Windsor, NY (US)

(72) Inventors: Jonathan I. Jones, Highland, NY (US); Frank Cogliano, Pomona, NY (US)

(73) Assignee: USAI, LLC, New Windsor, NY (US)

(21) Appl. No.: 17/974,937

(22) Filed: Oct. 27, 2022

Related U.S. Patent Documents

Reissue of:
(64) Patent No.: 10,816,172
Issued: Oct. 27, 2020
Appl. No.: 16/296,611
Filed: Mar. 8, 2019

U.S. Applications:
(60) Provisional application No. 62/640,396, filed on Mar. 8, 2018.

(51) Int. Cl.
*F21V 21/04* (2006.01)
*F21S 8/02* (2006.01)

(52) U.S. Cl.
CPC ..... *F21V 21/048* (2013.01); *F21S 8/026* (2013.01)

(58) Field of Classification Search
CPC ..... F21S 8/026; F21S 8/043; E04B 9/006; F21V 21/047
See application file for complete search history.

(56) References Cited

U.S. PATENT DOCUMENTS 3,697,742 A * 10/1972 Bobrick ..... F21V 21/04 362/366
3,816,880 A 6/1974 Jacobs
4,729,080 A * 3/1988 Fremont ..... F21V 21/04 362/148
5,029,794 A 7/1991 Wolfe
5,045,985 A 9/1991 Russo et al.
5,588,737 A * 12/1996 Kusmer ..... F21V 19/0005 174/67
5,699,641 A 12/1997 Tinen et al.
6,033,098 A * 3/2000 Hentz ..... B62J 6/00 248/228.7
6,076,788 A * 6/2000 Akiyama ..... E04B 9/006 248/200.1
6,341,466 B1 * 1/2002 Kehoe ..... F16B 2/241 52/39
6,345,800 B1 2/2002 Herst et al.
6,474,846 B1 * 11/2002 Kelmelis ..... F21S 8/026 248/231.91
6,722,918 B2 4/2004 McCoy
(Continued)

*Primary Examiner* — Andrew J Coughlin
(74) *Attorney, Agent, or Firm* — Farber LLC

(57) ABSTRACT

A lighting system has a lighting fixture with a housing and a pair of mounting brackets fixed to opposed sides of the housing and mounted to a hanger bar. Each mounting bracket is adapted to mount to a hanger bar without tools and the hanger bars are adapted to mount to the grid of rails without tools. The hanger bar can have first and second hanger bar members which are adapted to relatively move along a longitudinal axis (Y axis) of the hanger bar to extend and retract a length of the hanger bar. The mounting bracket is adapted to toollessly mount to the hanger bar at a predetermined vertical position (Z axis) and lateral position (X axis) relative to the hanger bar.

30 Claims, 52 Drawing Sheets

(56) References Cited

U.S. PATENT DOCUMENTS

| | | | | |
|---|---|---|---|---|
| 7,234,674 | B2 * | 6/2007 | Rippel | F21V 21/04 248/343 |
| 7,874,708 | B1 * | 1/2011 | Jones | F21V 21/048 362/148 |
| 7,896,529 | B2 * | 3/2011 | Wronski | F21S 8/02 362/365 |
| 8,038,113 | B2 * | 10/2011 | Fryzek | F21S 8/026 248/343 |
| 10,082,279 | B2 | 9/2018 | Jones et al. | |
| 10,125,958 | B1 * | 11/2018 | Wronski | F21V 21/047 |
| 10,135,232 | B2 * | 11/2018 | Nikayin | H02G 3/125 |
| 11,067,231 | B2 * | 7/2021 | Lotfi | F21V 23/06 |
| 11,808,430 | B2 * | 11/2023 | Danesh | F21V 15/01 |
| 2004/0182592 | A1 | 9/2004 | King et al. | |
| 2006/0243877 | A1 * | 11/2006 | Rippel | H02G 3/125 248/343 |
| 2006/0261235 | A1 * | 11/2006 | Rippel | F21V 21/04 248/343 |
| 2007/0183154 | A1 * | 8/2007 | Robson | F21V 17/164 362/267 |
| 2008/0224008 | A1 | 9/2008 | Dal Ponte et al. | E04B 9/006 248/298.1 |
| 2011/0080750 | A1 * | 4/2011 | Jones | F21V 21/048 362/418 |
| 2011/0226919 | A1 * | 9/2011 | Fryzek | F21V 21/048 248/298.1 |
| 2014/0299730 | A1 * | 10/2014 | Green | F21V 21/048 248/317 |
| 2015/0159824 | A1 | 6/2015 | Colan et al. | |
| 2017/0093140 | A1 * | 3/2017 | Nikayin | H02G 3/125 |
| 2017/0167699 | A1 * | 6/2017 | Schubert | F21S 8/026 |
| 2017/0307188 | A1 | 10/2017 | Oudina et al. | |
| 2018/0202634 | A1 * | 7/2018 | Farzan | F21V 23/001 |

* cited by examiner

LIGHTING SYSTEM FOR SUSPENDED CEILING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention is directed to the field of lighting fixtures, and in particular to lighting systems for suspended ceilings.

BACKGROUND OF THE INVENTION

A suspended ceiling (also known as a drop ceiling) is a common ceiling style. A suspended ceiling typically has a suspended framework composed of a grid of interconnected rails which typically form square openings, and a plurality of individual ceiling panels supported within the openings. The grid is attached to the existing ceiling or other structure with hangers or wires, and the panels are supported by the rails. Typically, each rails has an inverted-T cross section with opposed, laterally extending, horizontal flanges for supporting the ceiling tiles and a vertical portion extending upwardly from the horizontal flanges.

Traditionally, lighting, such as relatively small "down lights," have been incorporated into suspended ceilings by cutting a hole in a ceiling panel on-site, and mounting the lighting fixtures to the ceiling panels. However, this method requires manually cutting a hole in the ceiling panels and requires a relatively large trim or flange to conceal the rough edge of the cut hole. Also, with this method, the ceiling panel supports the lighting fixture and over time the ceiling tile can deform or sag under the weight of the lighting fixture.

Therefore, what is desired is an improved method of incorporating lighting in to a suspended ceiling.

SUMMARY OF THE INVENTION

The lighting system of the present invention provides an improved method and system for incorporating lighting in a suspended ceiling having, for example, a framework including a grid of rails having opposed, laterally extending, horizontal flanges for supporting the ceiling tiles and a vertical portion extending upwardly from the horizontal flanges. The vertical portion of the rail includes a relatively wide head and a relatively narrow web below the head.

The lighting system has a lighting fixture with a housing and has a pair of mounting brackets fixed to opposed sides of the housing and mounted to a hanger bar. Each mounting bracket is adapted to mount to a hanger bar without tools and the hanger bars are adapted to mount to the grid of rails without tools.

Each hanger bar has a mounting clip with a locking portion adapted to be disposed below and to engage a bottom of the head of the rail, when the hanger bar is mounted on the rail.

The mounting bracket has biased member to secure the mounting bracket to the hanger bar such that the mounting bracket is fixed relative to the hanger bar, and the biased member is adapted to releasably and toollessly engage the hanger bar The hanger bar can have first and second hanger bar members which are adapted to relatively move along a longitudinal axis (Y axis) of the hanger bar to extend and retract a length of the hanger bar. The first and second hanger bar members can each have a channel portion including a vertical portion and spaced-apart upper and lower horizontal flanges extending from the vertical portion, with an overlapping portion where a portion of the channel of the first hanger bar member is nested within a portion of the channel of the second hanger bar member. The mounting bracket is adapted to mount to the hanger bar in a horizontal lateral direction (X axis), and when mounted, the mounting bracket is at a predetermined vertical position (Z axis) and lateral position (X axis) relative to the hanger bar.

When mounted to the hanger bar, the mounting bracket is adapted to slide along a longitudinal length (Y axis) of the hanger bar from among positions wherein, as to the hanger bar, the mounting bracket is in contact with: (a) only the channel of the first hanger bar member, (b) only the channel the second hanger bar member, and (c) the channels of both of the and second hanger bar members, while maintaining the predetermined vertical position (Z axis) and lateral position (X axis) relative to the hanger bar.

BRIEF DESCRIPTION OF THE DRAWINGS

FIGS. 16-20 are views of an embodiment of a cover of the lighting system showing attachment of the trim element to the collar, wherein FIG. 20 is a section taken along line A-A of FIG. 19.

FIGS. 45-55C are views of an embodiment of the hanger bars of the lighting system, wherein FIG. 46 is a view of Detail A of FIG. 45.

FIGS. 56-62 are views of an embodiment of the mounting bracket of the lighting system, wherein FIGS. 61 and 62 are cross-section views taken along lines B-B and C-C, respectively, of FIG. 54.

DETAILED DESCRIPTION OF THE INVENTION

Figure 1:
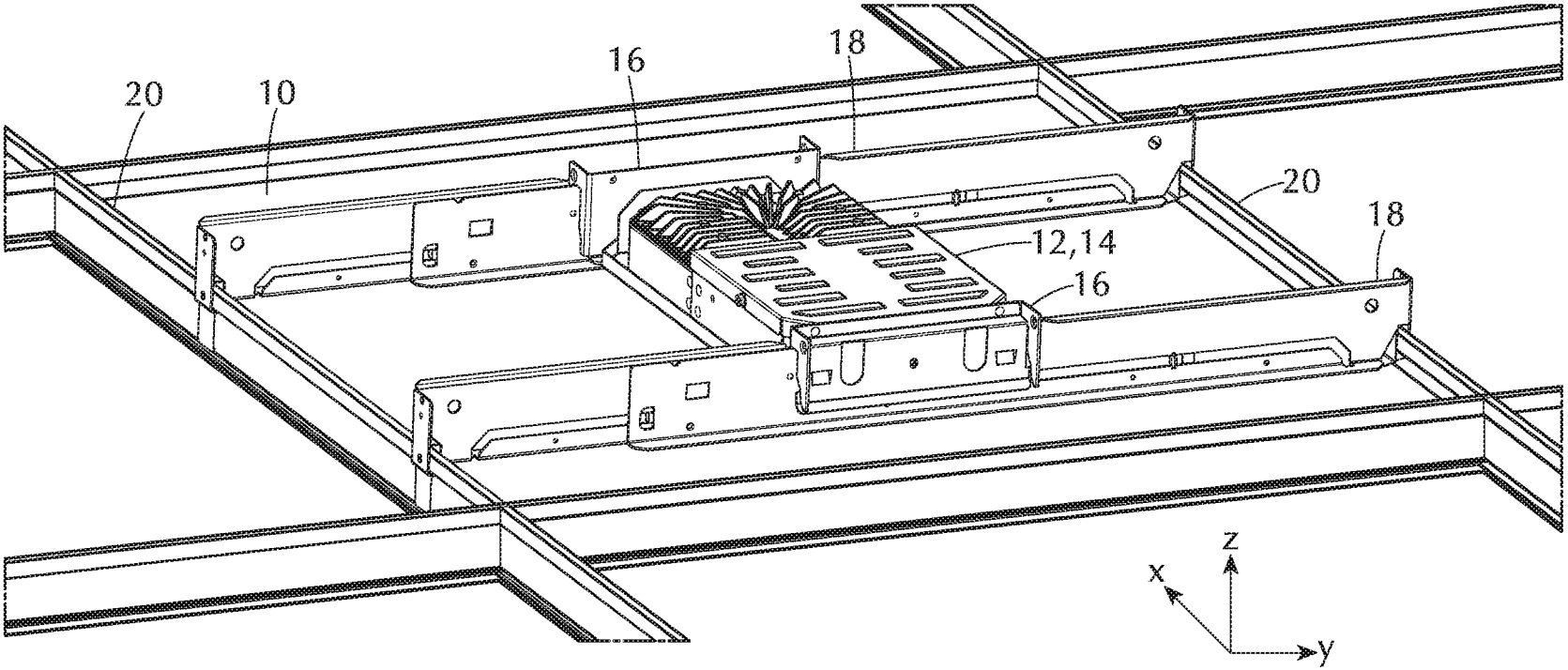
FIG. 1 is a perspective view of an embodiment of the lighting system mounted to a drop ceiling support framework in accordance with an embodiment of the invention.

Referring to FIGS. 1-63, the lighting system is particularly suitable for incorporating lighting in suspended ceilings, such as the type having a framework or grid of rails and a plurality of ceiling panels supported by the rails. The lighting system provides improvements both in the appearance of such lighting as well as the method of mounting and installation.

Referring to FIGS. 1-43, in an embodiment, the lighting system 10 includes a lighting fixture 12 with a housing 14 enclosing a lighting element 30 (such as an LED lighting element), a lighting driver for driving the lighting element, and a junction box for connecting the lighting fixture to external power and control. The lighting fixture 12 includes a pair of mounting brackets 16 affixed to opposed ends of the housing 14 and each mounting bracket 16 is operable to toollessly mount to one of pair of hanger bars 18. Each hanger bar 18 is adapted to toollessly mount to a pair of opposed rails 20 of the framework, to support the lighting fixture 12 above a ceiling panel 22.

Figure 2:
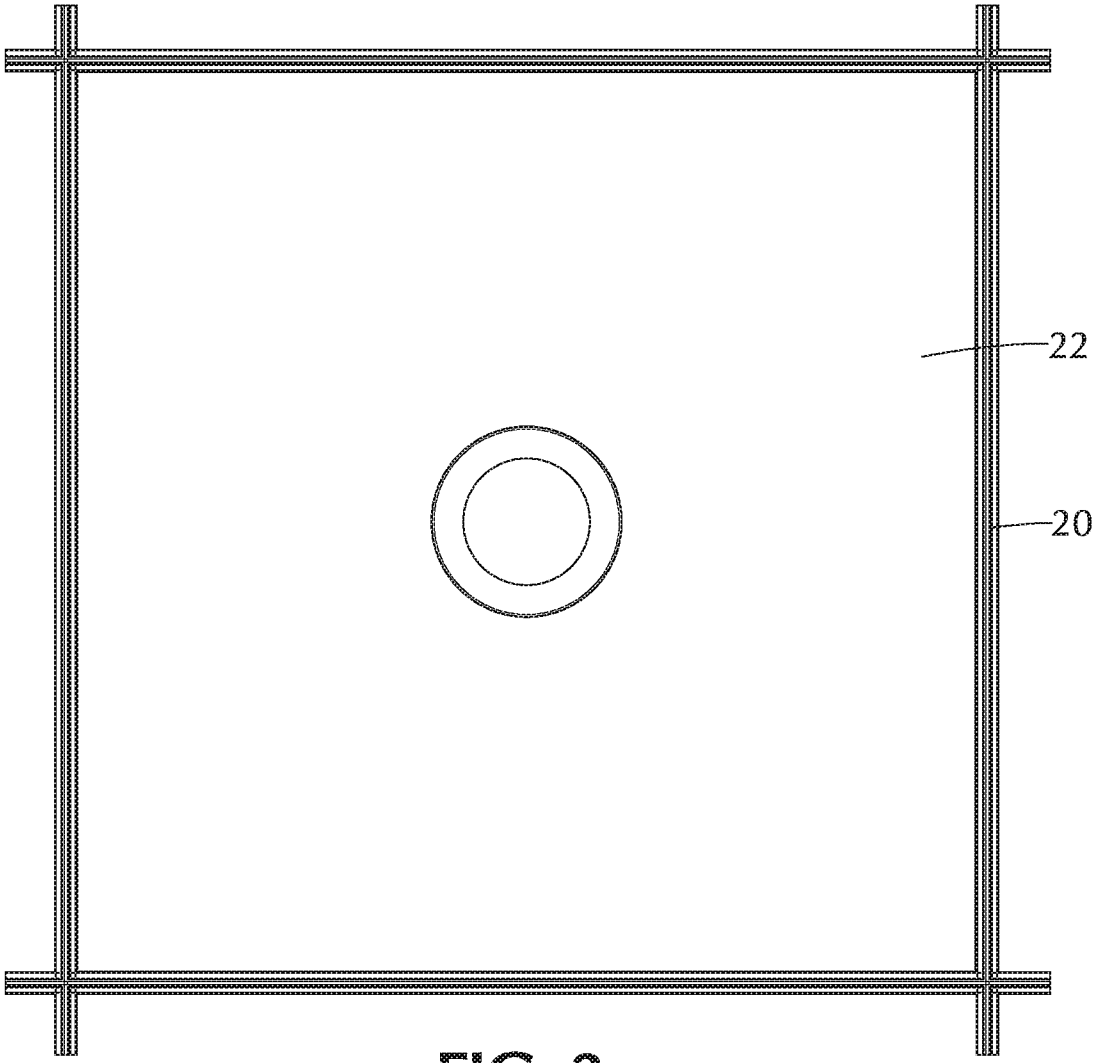
FIG. 2 is a view of an embodiment of the lighting system installed in a ceiling structure having a circular opening, from below.
Figure 3:
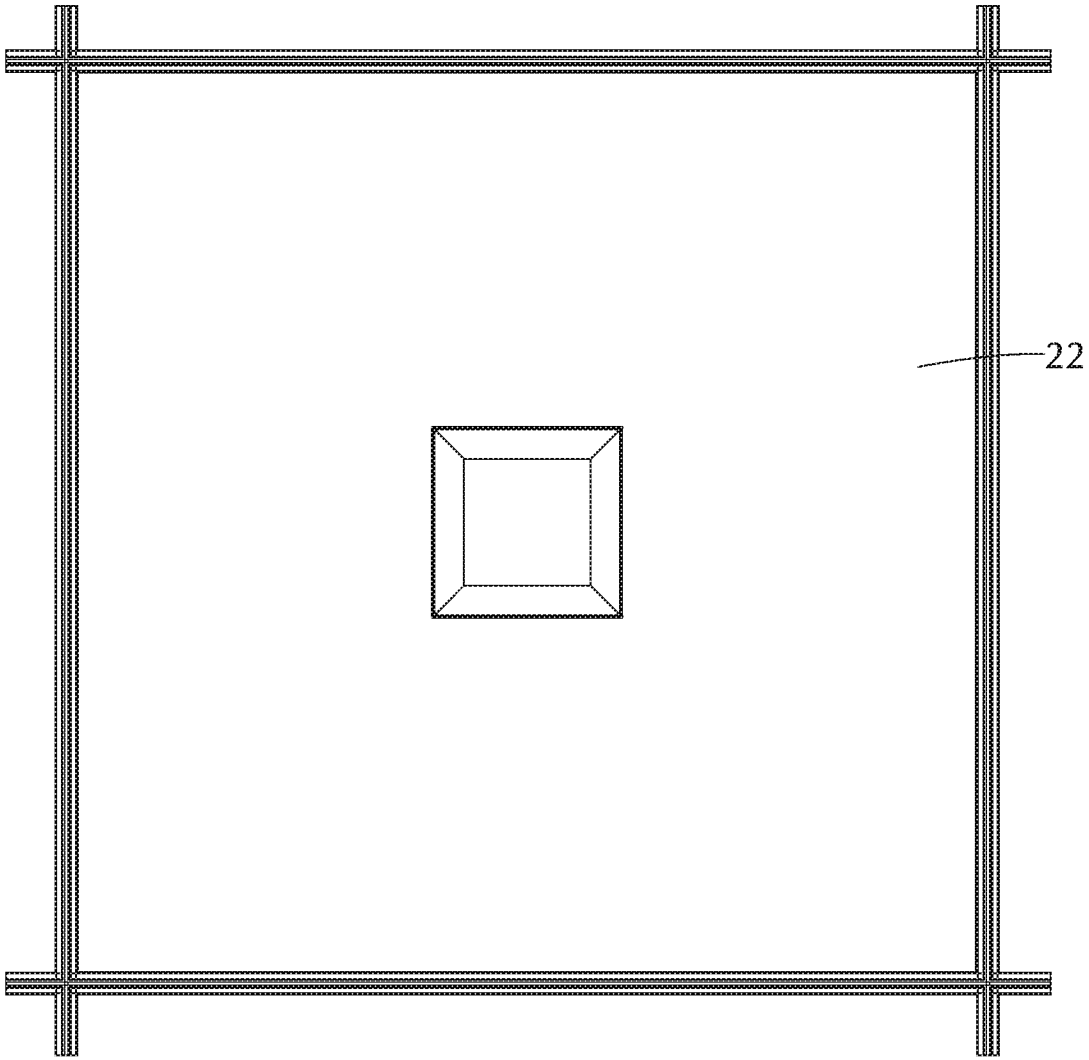
FIG. 3 i is a view of an embodiment of the lighting system installed in a ceiling structure having a square opening, from below.
Figure 4:
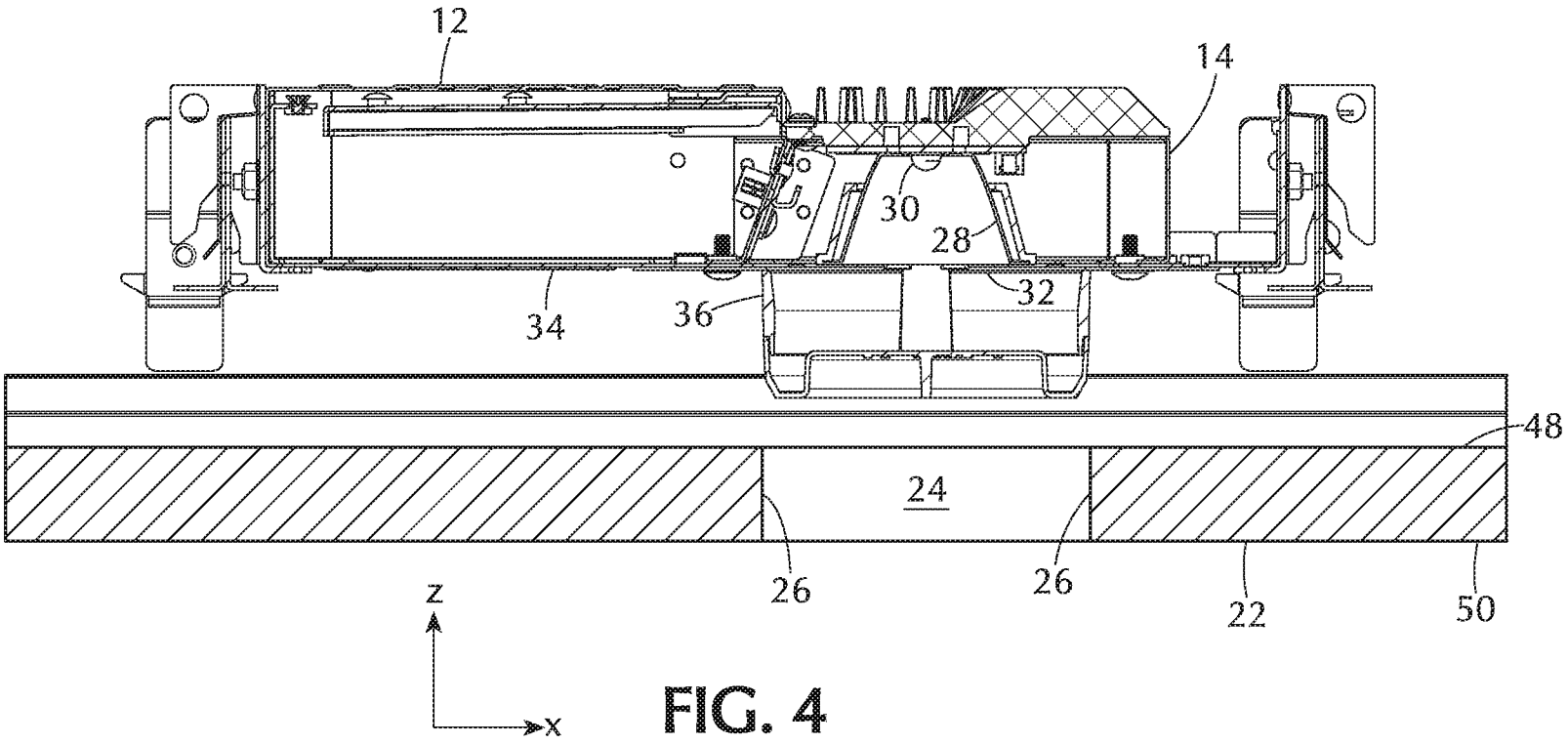
FIG. 4 is a cross-section side elevation view of an embodiment of the lighting system prior to attachment to the framework of rails.
Figure 5:
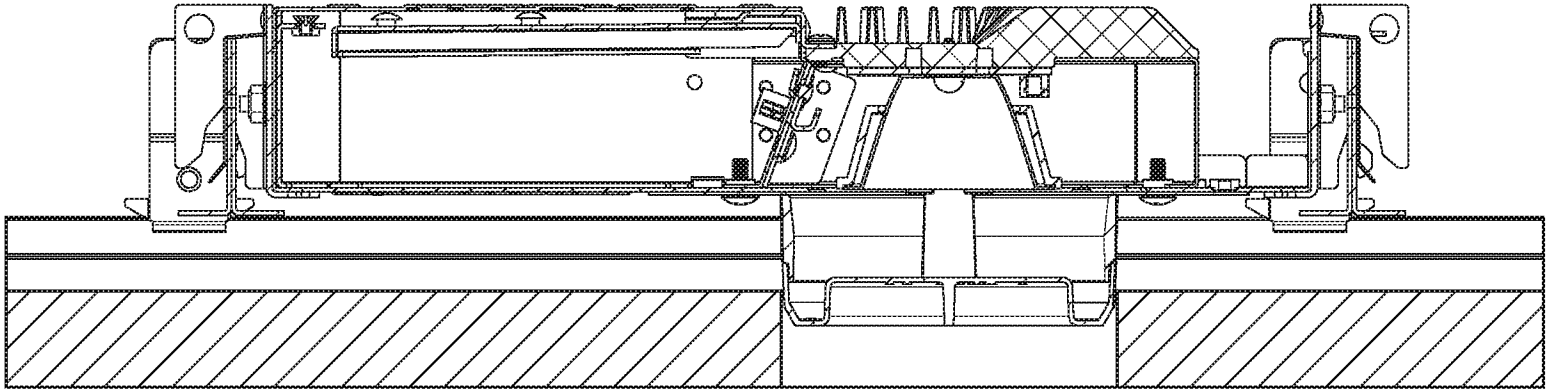
FIG. 5 is a cross-section side elevation view of and embodiment of the lighting system during attachment to the framework of rails.
Figure 6:
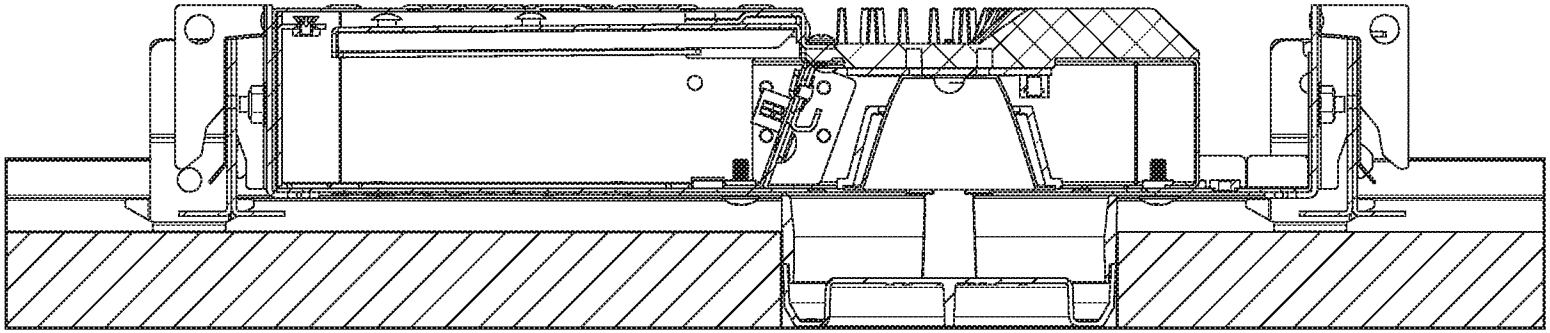
FIG. 6 is a cross-section side elevation view of an embodiment of the lighting system after attachment to the framework of rails.
Figure 7:
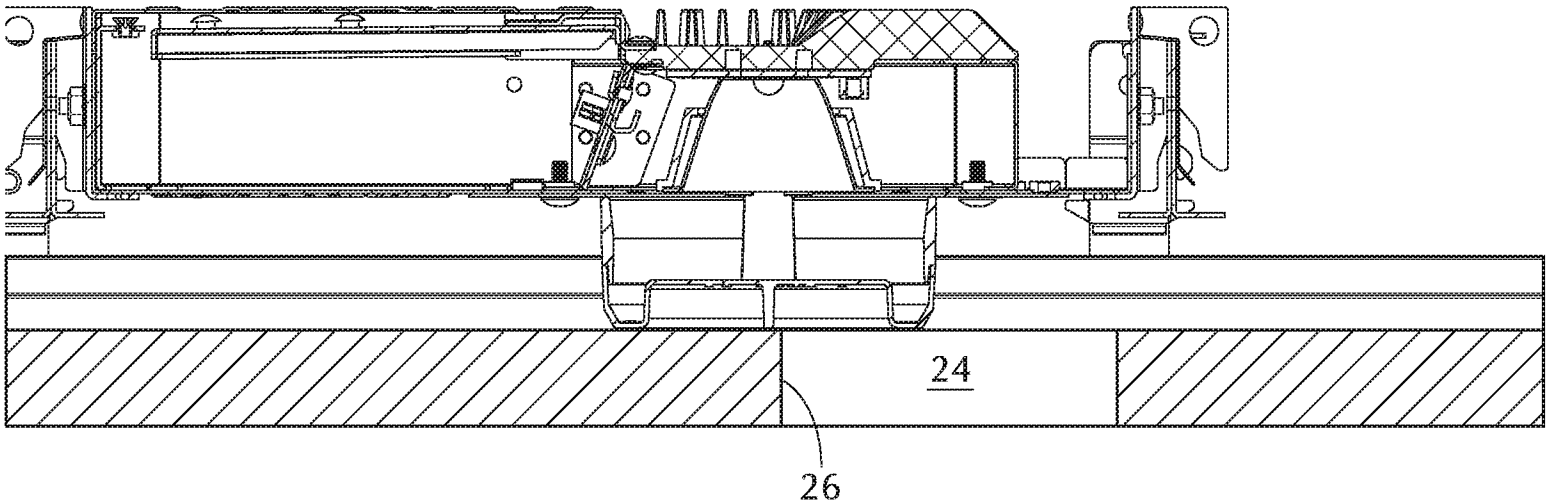
FIG. 7 is a cross-section side elevation view of an embodiment of the lighting system during alignment prior to attachment to the framework of rails.
Figure 8:
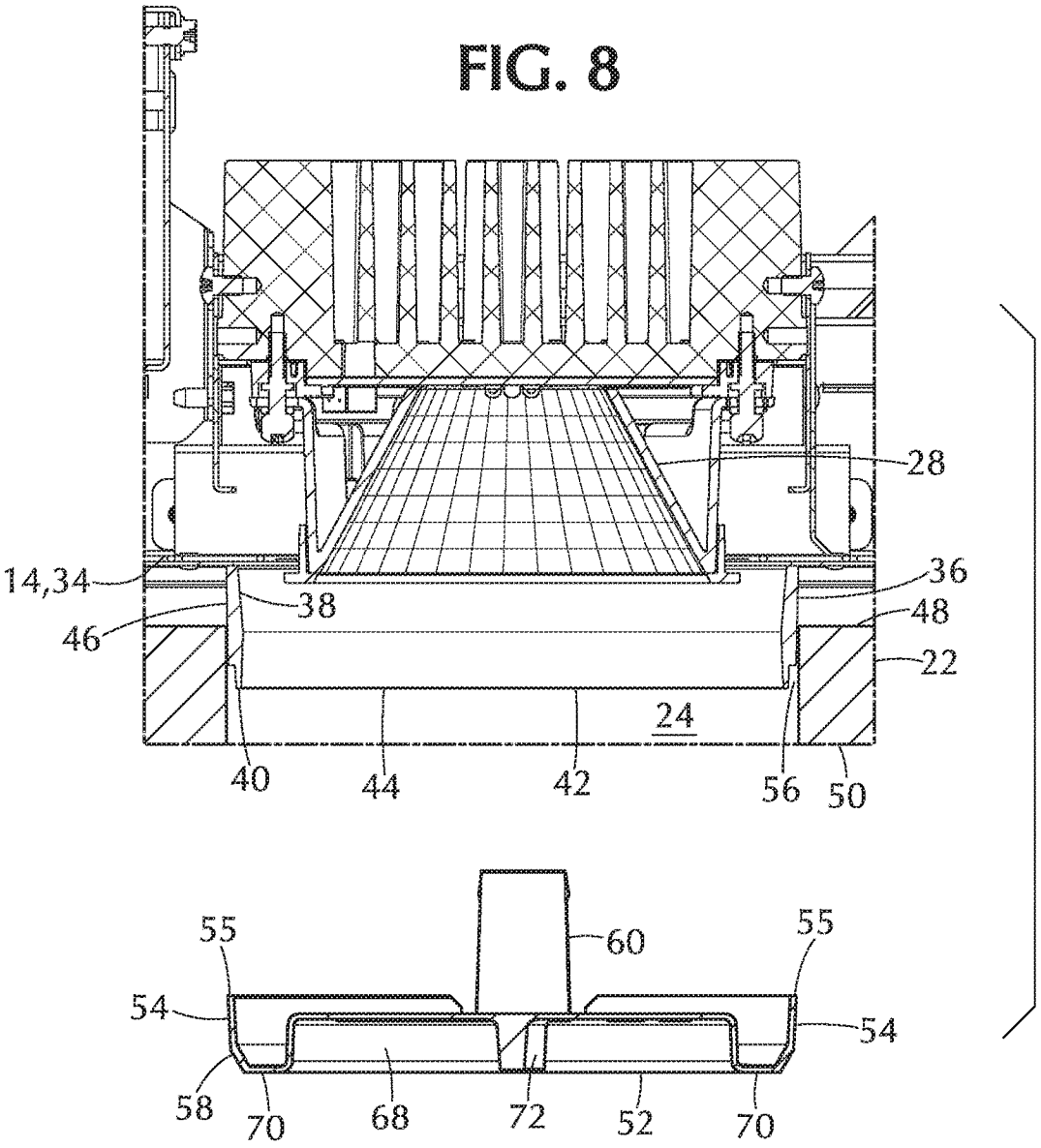
FIG. 8 is an enlarged cross-section side elevation view of an embodiment of the lighting system.
Figure 9:
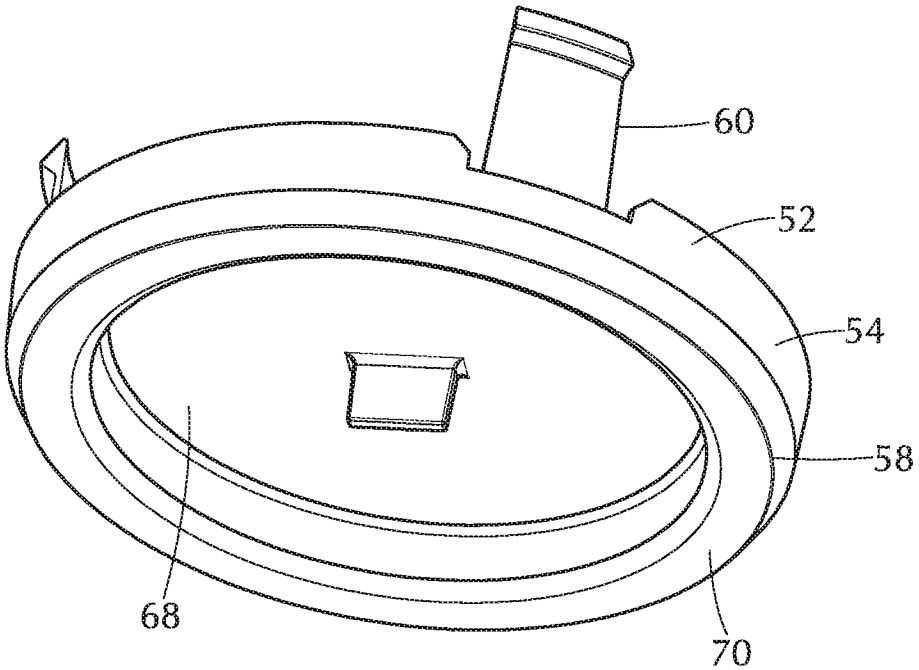
FIGS. 9-10 are views of an embodiment of a cover of the lighting system.
Figure 10:
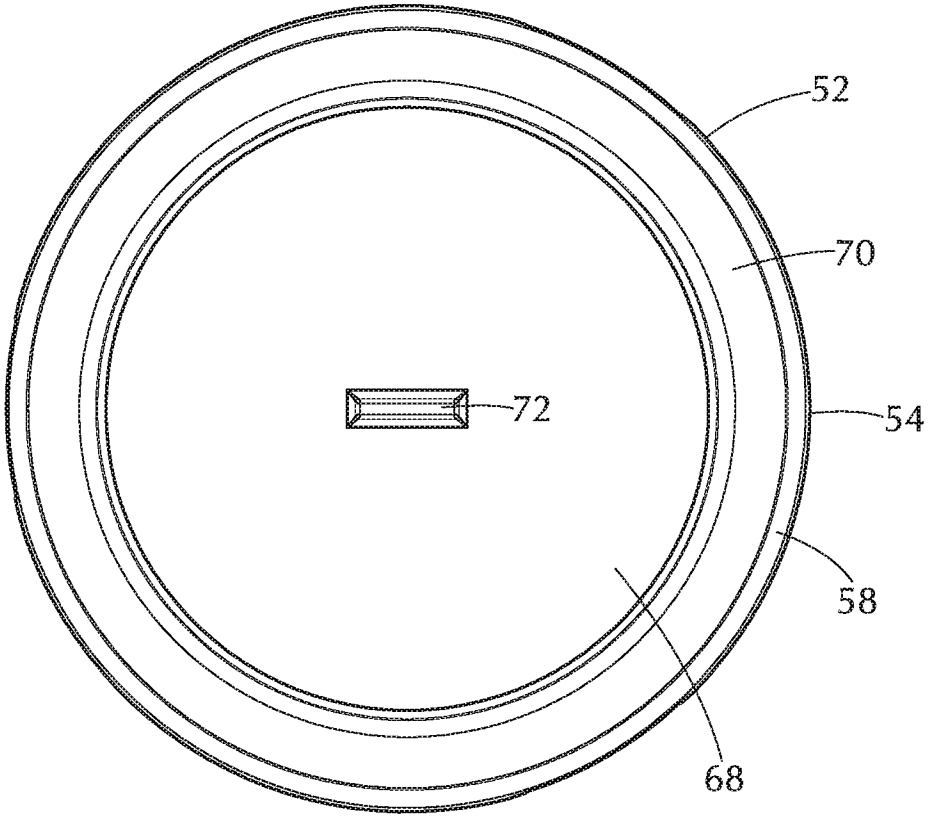
Figure 11:
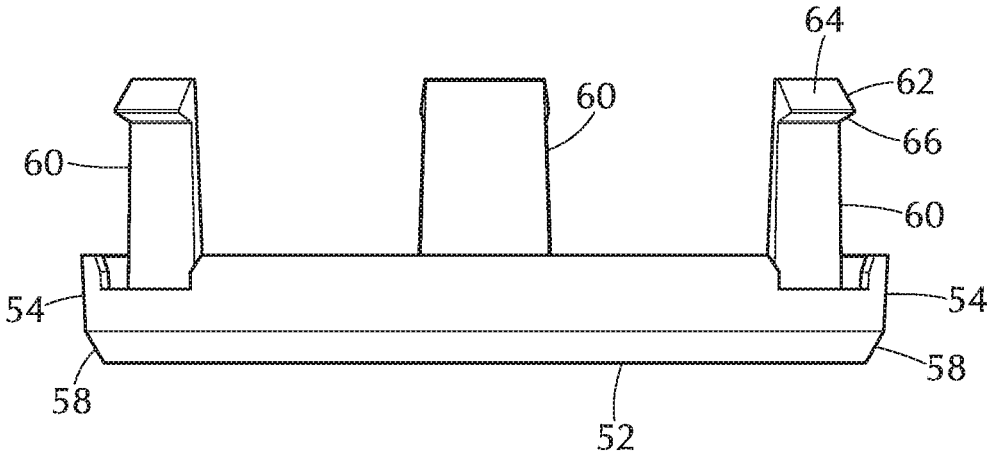
Figure 12:
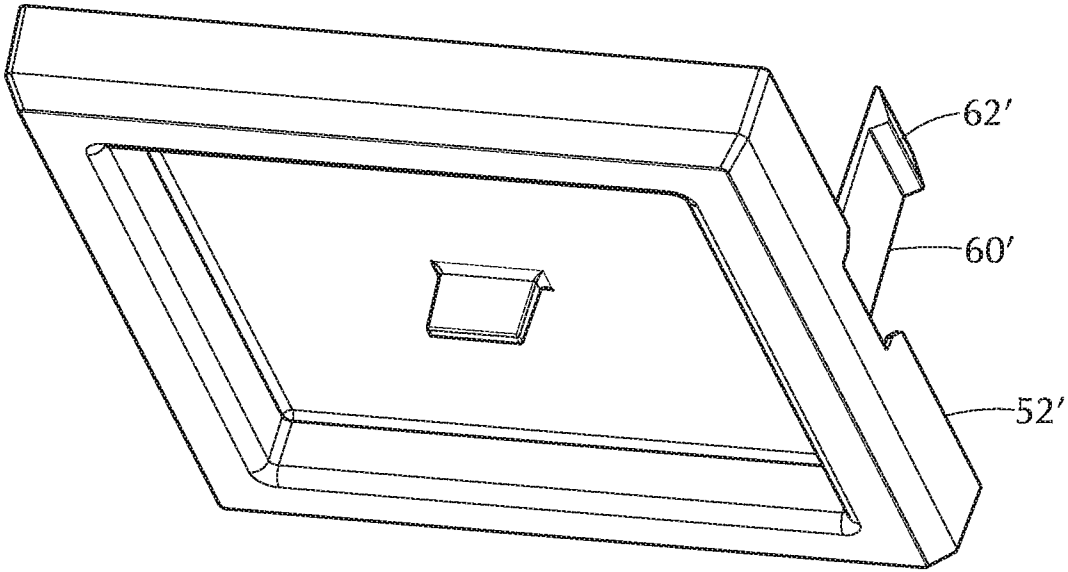
FIG. 12-14 are views of an embodiment of a cover of the lighting system.
Figure 13:
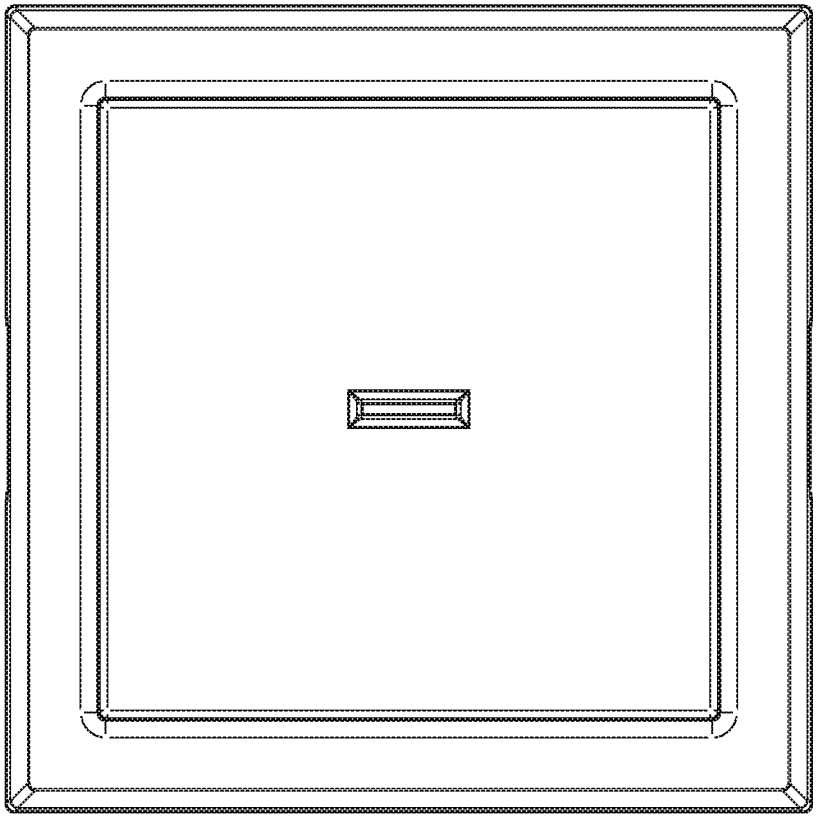
Figure 14:
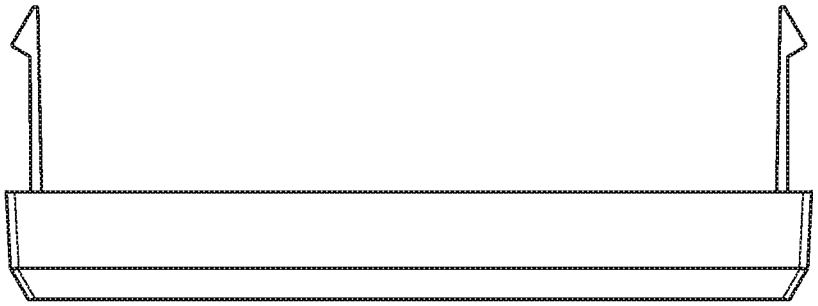
Figure 15:
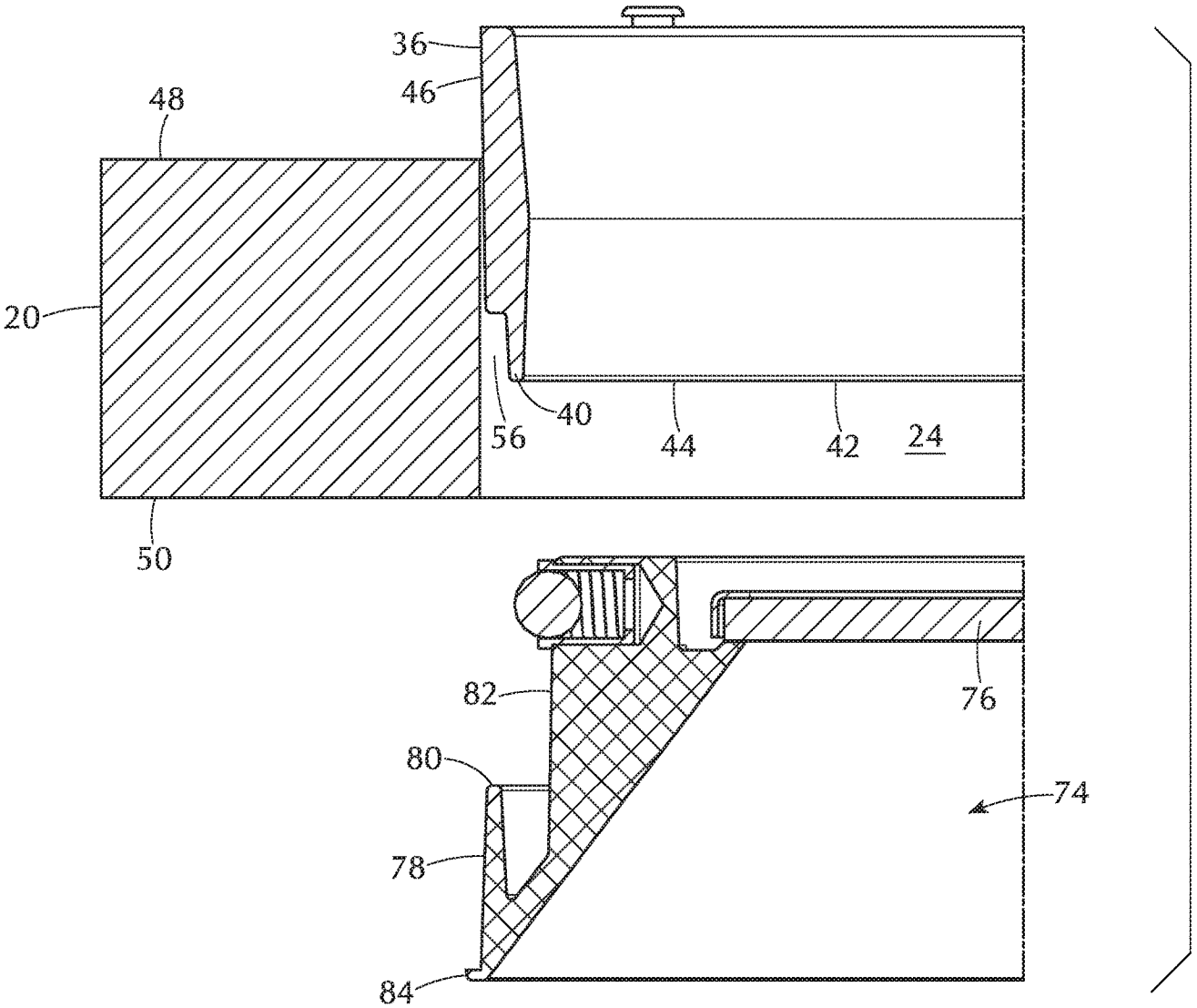
Figure 16:
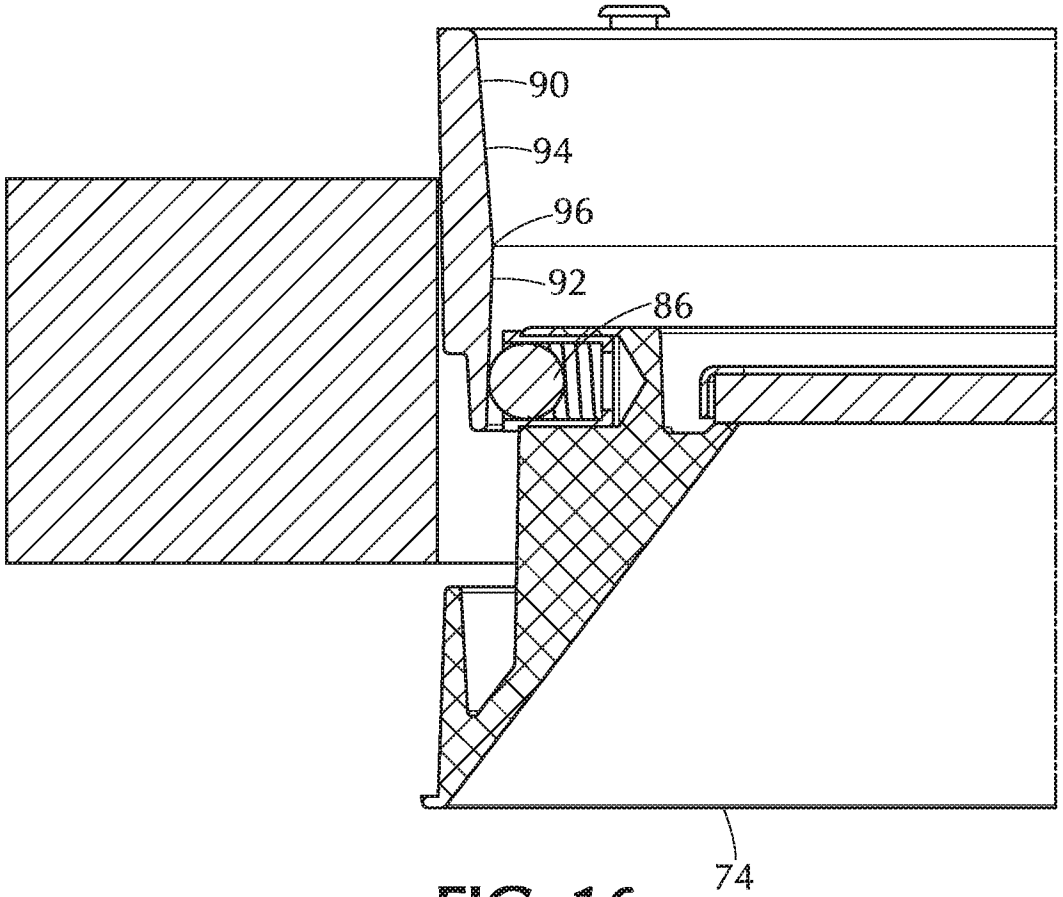
Figure 17:
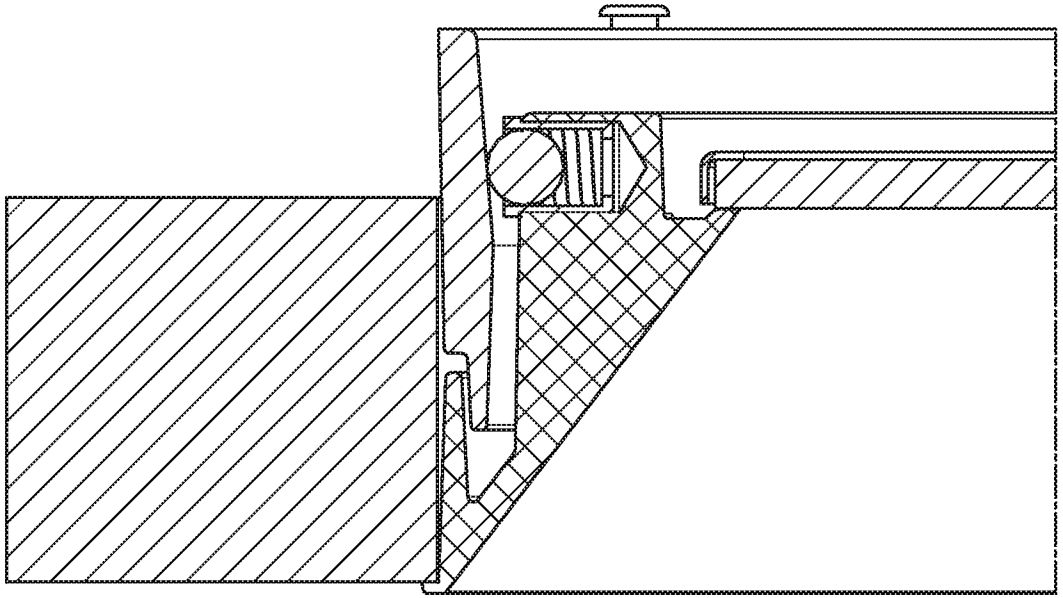
Figure 18:
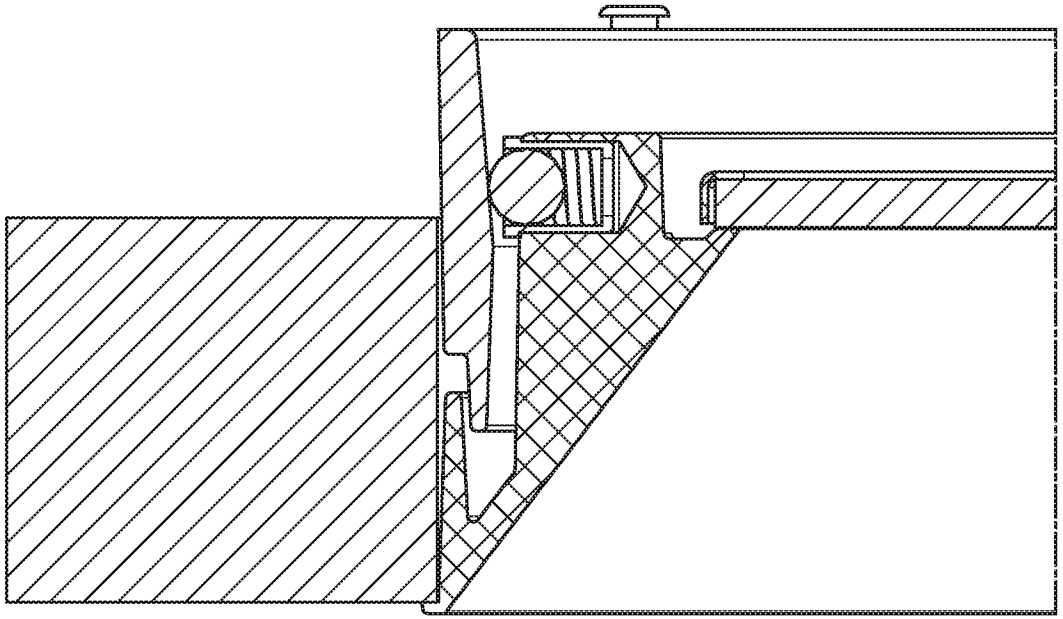

Referring to FIGS. 2 and 3, the lighting system 10 is particularly adapted for use with ceiling panels 22 having a pre-engineered opening 24, which are cut by an automated method, such as a computer numerically-controlled (CNC) process, so that the shape, size and position of the hole are precisely determined and within a very low tolerance or variation. For example, the hole can be nearly perfectly round or square/rectilinear, with a defining size dimension (e.g., radius/diameter or side length) of about 3.500 in to 3.532 in, with a tolerance of +/−0.016 in, and the position of the center of the hole can be precisely aligned with a center of the ceiling panel or another predetermined position in longitudinal and/or lateral directions with respect to the panel (i.e., on X and Y horizontal orthogonal axes). The interior wall(s) 26 of the opening 24 is preferably substantially vertical (i.e., parallel to a Z axis, mutually orthogonal to the X and Y axes). The lighting system provides for a corresponding precise size and alignment of the lighting fixture.

Referring to FIGS. 4-8, the lighting fixture 12 includes an aperture 32 in a bottom 34 of the housing 14 for emitting light from the light fixture. A reflector 28 within the housing [24] *14* is disposed around the lighting element 30 to direct light toward and through the aperture 32.

The lighting fixture 12 also includes a collar 36 depending downwardly from the bottom 34 of the housing 14, and surrounding the aperture 32. A proximal or top end 38 of the collar 36 is fixed to the housing 14 and a distal or bottom end 40 of the collar is spaced downwardly from the bottom 34 of the housing 14 forming an open end defined by a peripheral edge 44.

An outside wall [48] *46* (or walls) of the collar 36 is preferably substantially vertical (i.e., parallel to a Z axis, mutually orthogonal to the X and Y axes). The shape and size of the horizontal cross section of the exterior of the collar 36 are adapted to closely correspond to that of the opening 24 in the ceiling panel [20] *22* such that the collar 36 substantially spans between the interior walls 26 of the opening 24. For example, the exterior of the collar 36 can be nearly perfectly round or square/rectilinear, with a defining size dimension(s) (e.g., radius/diameter or side length) about 3.492 in to 3.502 in (+/−0.005 in), which is slightly less than the corresponding dimension(s) of the opening in the ceiling panel. Therefore, the gap between the exterior of the collar and the opening in the ceiling panel will typically be very small, about 0.000 in to 0.037 in (0.040 in). A center of the collar 36 is preferably aligned (i.e., falls on) a horizontal longitudinal center line of the housing (e.g., parallel to the X axis). The depth or height of the collar 36 is configured such that when the lighting fixture is installed (see FIGS. 6 and 8), the collar 36 extends partially into, but does not extend entirely through, the opening in the ceiling panel [20] *22*, such that the peripheral edge 44 of the collar 36 is disposed between a plane of a top surface of the ceiling panel 22 and a plane of a bottom surface 50 thereof.

Referring to FIGS. 9-14, in an embodiment, the lighting fixture has a cover 52, *52′* for the open end 42 of the collar 36 which is adapted to removably mount to the lighting fixture prior to installation. Preferably, the cover 52, *52′* is preferably composed of or includes transparent or translucent material such that the light fixture 12 may be used during construction activities with the cover installed.

The cover 52, *52′* is configured to provide a seal for the open end 42 of the collar 36 and to provide protection for the interior of the lighting fixture 12 during construction activity. In addition, the cover 52, *52′* is configured to aid in alignment of the lighting fixture 12 during installation. The cover 52, *52′* has a circumferential exterior wall 54 defining a horizontal cross-section having a shape and size corresponding to that of the exterior (outside wall 46) of the collar 36. When the cover [36] *52, 52′* is mounted to the light fixture 12, the exterior wall 54 of the cover (including a peripheral edge 55 thereof) is substantially parallel and co-planar with the outer wall 46 of the collar 36 (i.e., flush with the outer wall). This provides for smooth and snag-free insertion of the collar and cover assembly into the opening 24 in the ceiling panel 22 during installation, which by design is a close fit.

In addition, the collar 36 preferably has a circumferential notch or recess 56 on the outside wall 46 adjacent and extending to the peripheral edge 44, which is sized and shaped to closely receive the peripheral edge 56 of the exterior wall 54 of the cover 52 which extends partially over and radially outwardly of the peripheral edge 44 of the collar 36. This provides an air-lock around the periphery 44 of the collar 36 to substantially seal the interior of the light fixture 12 from dust and other potential contaminates during construction activities.

The cover 52 preferably mounts to the light fixture 12 in a vertical (e.g., upward) direction and is removed in an opposite (downward) direction, without horizontal (radial) expansion of the exterior wall 54 of the cover. Thus, after installation of the light fixture 12, the cover 52 can be removed from the light fixture 12, through the opening 24 in the panel 22, (and can be re-mounted to the light fixture through such opening if desired) with no snagging or jamming, or other interference, between the cover 52 and the closely-adjacent wall 26 of the opening 24 of the panel 22.

In an embodiment, the cover 52, *52′* can include a plurality of (e.g., 3) circumferentially-spaced attachment hooks 60, *60′* disposed radially inwardly from the exterior wall 54, and projecting upwardly relative to the face portion 53. Each attachment hook 60, *60′* is adapted to extend upwardly through the interior of the collar 36 and to releasably engage an interior portion of the housing 14, such as a rim of the aperture 32, for removably mounting the cover 52, *52′* to the light fixture 12. Each attachment hook 60, *60′* is adapted to resiliently deflect radially inwardly during mounting to and removal from the housing 14 and includes radially-outwardly projecting portions 62, *62′* on a free end portion thereof. The projecting portions 62, *62′* have opposed cam surfaces 64, 66 which engage the rim of the aperture 32 of the housing 14 during mounting and removal of the cover 52, *52′* .

In an embodiment, the cover 52 can include a circumferential chamfered (or angled) portion 58 extending downwardly and radially inwardly from a bottom of the exterior wall 54 of the cover 52. The chamfered portion 58 serves to assist in the alignment of the light fixture during installation, along the longitudinal and/or lateral axes (i.e., parallel to X and Y axes). In particular, if, during installation, the collar 36 is misaligned with the opening 24 in the ceiling panel 22 within a range, the chamfered portion 58 of the cover 52 contacts the edge of the opening 24 of the ceiling panel 22, and the light fixture 12 will be urged toward proper alignment with the opening 24.

A bottom portion of the cover 52 can include a central recessed portion 68 and a circumferential horizontal support surface 70 disposed intermediate the recessed portion 68 and the chamfered portion 58. The horizontal support surface 70 is adapted to contact and slide along a top surface 48 of the ceiling panel 22 during installation and alignment of the light fixture 12. The cover 52 can include a grip 72 disposed in the recessed portion for insertion and removal of the cover. The cover can be removed after installation of the light fixture, from below (i.e., from within the room).

Referring to FIGS. 15-20, in an embodiment, the lighting fixture 12 also includes a finishing trim element 74 which is removably mountable to the collar 36 from below the light fixture (i.e., from within the room), after removal of the cover 52. The trim element 74 is preferably composed primarily of metal and includes a lens or diffuser 76 disposed between the lighting element and an opening of the trim element on the room-facing side of the light fixture.

The trim element 74 has a lower circumferential, vertical exterior wall(s) 78 defining a horizontal cross-section having a shape and size corresponding to that of the outside wall(s) 46 of the collar. When the trim element 74 is mounted to the collar 36, the lower exterior wall 78 of the trim element 74 is substantially parallel and co-planar with the outside wall 46 of the collar 36 (i.e., flush with the outside wall). (See FIG. 8) This provides for smooth and snag-free insertion of the closely-fitting trim element 74 into the opening 24 in the ceiling panel 22 from within the room. In addition, a top portion 80 of the lower exterior wall 78 extends into the circumferential notch 56 of the outside wall 46 of the collar 36 and closely overlaps the peripheral edge 44 of the collar 36 in a vertical direction. This provides a light-trap to prevent light from escaping laterally radially outwardly (horizontally) from the collar/trim assembly, which if permitted could cause illumination of the interior of the ceiling panel surrounding the opening, resulting in an undesirable halo effect around the opening.

The trim element 74 also includes an upper circumferential exterior wall(s) 82 disposed radially inwardly from and partially overlapping the lower circumferential exterior wall 78 in a vertical direction. When the trim element 74 is mounted to the collar 36, a portion of the upper circumferential exterior wall 82 is disposed within the interior of the collar 36 (i.e., between the exterior walls 54 thereof) and the peripheral edge 44 of the collar 36 projects between the upper and lower circumferential exterior walls of the trim element, in the area of overlap.

The trim element 74 also includes a preferably integral, circumferential flange 84 extending laterally radially outwardly (horizontally) from a bottom of the trim element (i.e., from a bottom of the lower circumferential exterior wall). The circumferential flange 84 has a minimal width for concealing the narrow gap between the outside wall 46 of the collar 36 and the side wall 26 of the opening [26] *24* in the ceiling panel 22. In particular, the circumferential flange 84 can have a width, as measured horizontally from the lower circumferential exterior wall, of about 0.040 in as measured from the lower circumferential exterior wall (i.e., from above), or 0.060 in if measured from the opening of the collar (from within the room below). Thus, the length of the circumferential flange 84 is about $1/8s^{th}$ (or 1/5sth if measured from below) of the diameter/width of the circular/square opening 24 in the ceiling panel 22. This minimal flange is sufficient to cover the minimal gap of about 0.000 in to 0.037 in (or 0.040 in), typically formed between the collar/trim assembly and the opening in the ceiling panel. When the trim element 74 is mounted to the collar, the circumferential flange 84 abuts a bottom surface 50 of the ceiling panel 22 around a circumference of the opening 24 in the panel.

In an embodiment, a mounting mechanism of the trim element 74 provides for toolless mounting of the trim element to the collar 36 and provides automatic and consistent positioning of the trim element relative to the ceiling panel. The mounting mechanism can include a plurality of biased members 86 (e.g., 3 or 4 spring biased bearings, or "ball plungers") which project radially horizontally, laterally outwardly from a top portion of the upper circumferential exterior wall 82 and which are disposed at regular angular intervals around the upper circumferential exterior wall. The biased members 86 engage an interior wall 90 of the collar 36 and are adapted to releasably mount the trim element 74 to the collar 36. When the trim element 74 is mounted to the collar 36, the biased members are displaced (i.e., compressed) and provide friction to resist removal of the trim element, which is at least sufficient to overcome the force of gravity.

The trim mounting mechanism is infinitely variable in that it allows the trim element 74 to be mounted to the collar 36 in an infinite number of vertical positions within a range relative to the collar. This allows the light fixture 12 to adapt to variations in the vertical position of the bottom 50 of the ceiling panel 22 relative to the light fixture when mounted to the grid of rails, which can be caused by variations of the installation, such as variations in the positioning of the lighting fixture relative to the ceiling panel and/or variations in the thickness of the ceiling panel. In particular, the variability of the trim mounting mechanism allows and ensures that the circumferential flange 84 of the trim element will abut the bottom 50 of the ceiling panel 22 when the trim element is mounted to the collar 36 regardless of variations in the vertical position of the bottom 50 of the ceiling panel 22 relative to the light fixture 12.

Additionally, preferably, the interior wall 90 of the collar 36 has a lower portion 92 which is angled slightly upward and radially inwardly and an upper portion 94 which is angled slightly upward and radially outwardly, such that a radially-inwardly directed, horizontal circumferential peak 96 is formed between the lower and upper portions of the interior wall. Further the peak 96 is positioned such that when the trim element 74 is mounted to the collar 36, the biased members 86 pass over and are disposed above the peak 96. Therefore, the biased members 86, acting on the upper portion 94 angled upward and radially outwardly, tend to urge the trim element 74 upward toward the collar 36 and the circumferential flange 84 in an abutting position with the bottom 50 of the ceiling panel 22. Optionally, the relative positions of the biased members and the angled walls could be reversed such that the biased member project radially inwardly from an interior of the collar and engage the upper exterior wall of the trim element.

Figure 19:
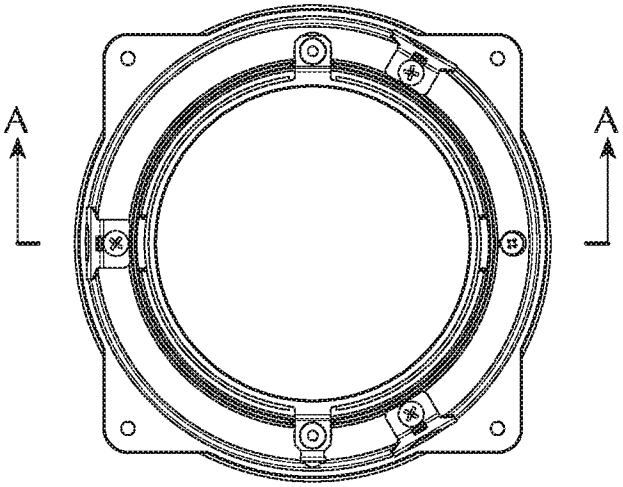
Figure 20:
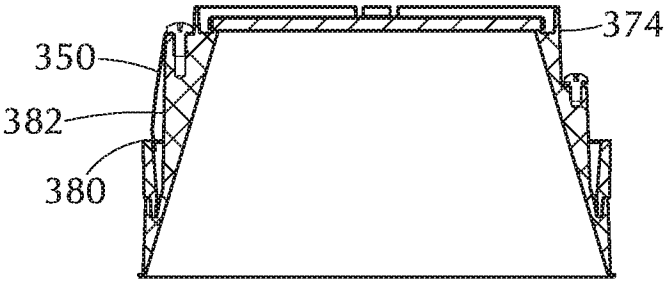
Figure 21:
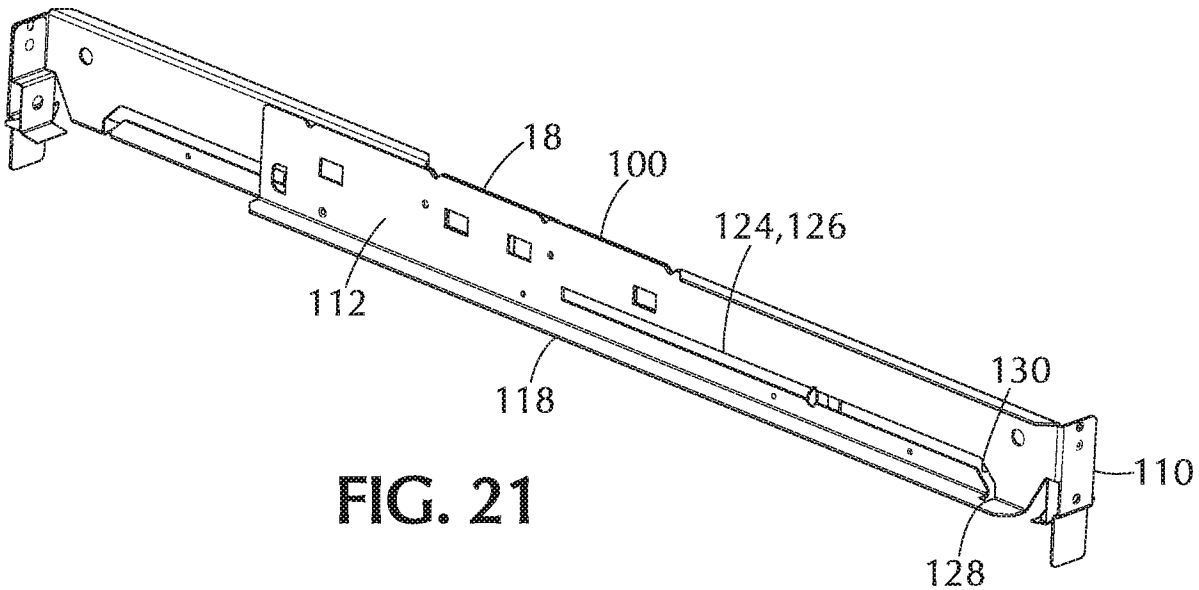
FIGS. 21-35 are views of an embodiment of the hanger bar of the lighting system.
Figure 22:
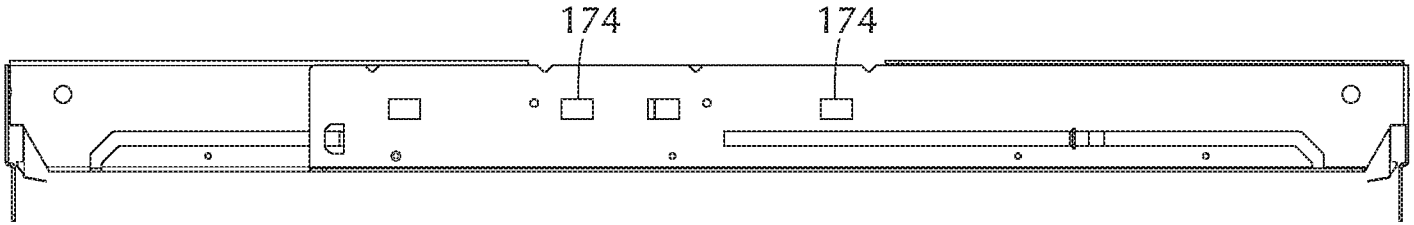
Figure 23:
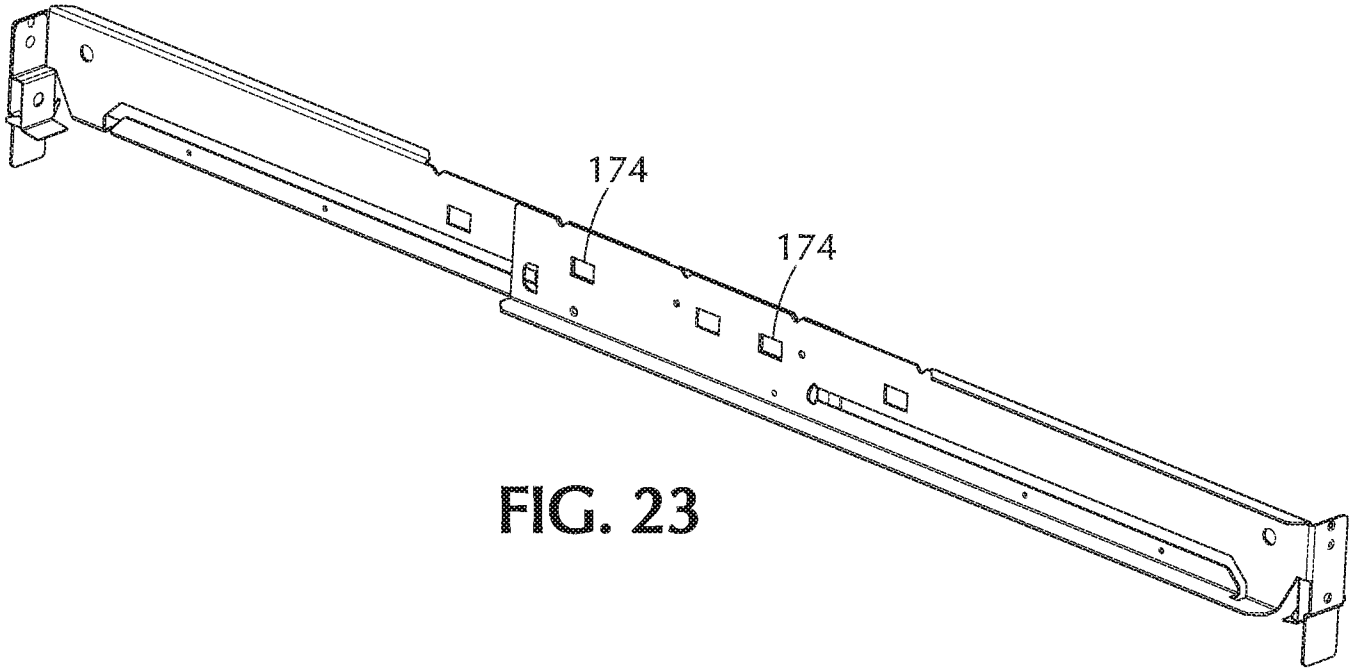
Figure 24:
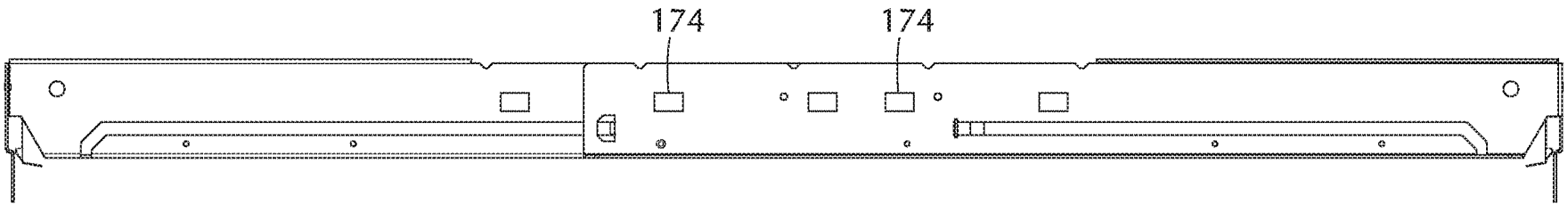
Figure 25:
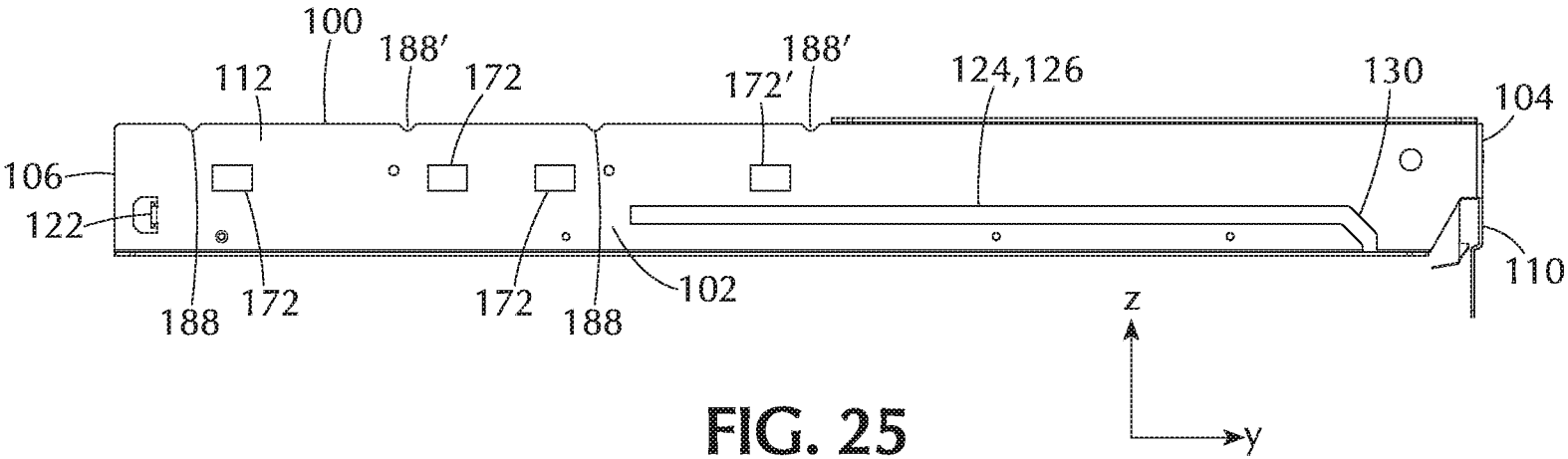
Figure 26:
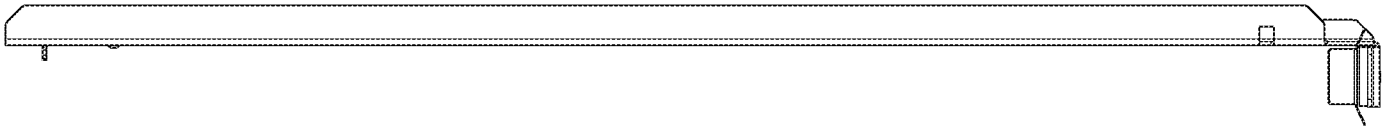
Figure 27:
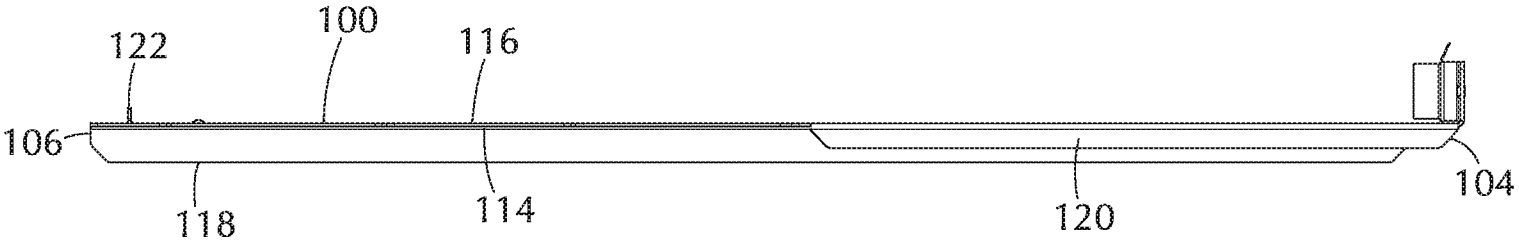
Figure 28:
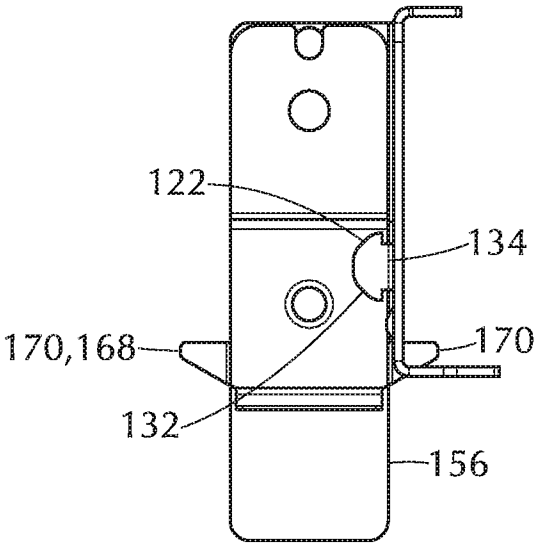
Figure 29:
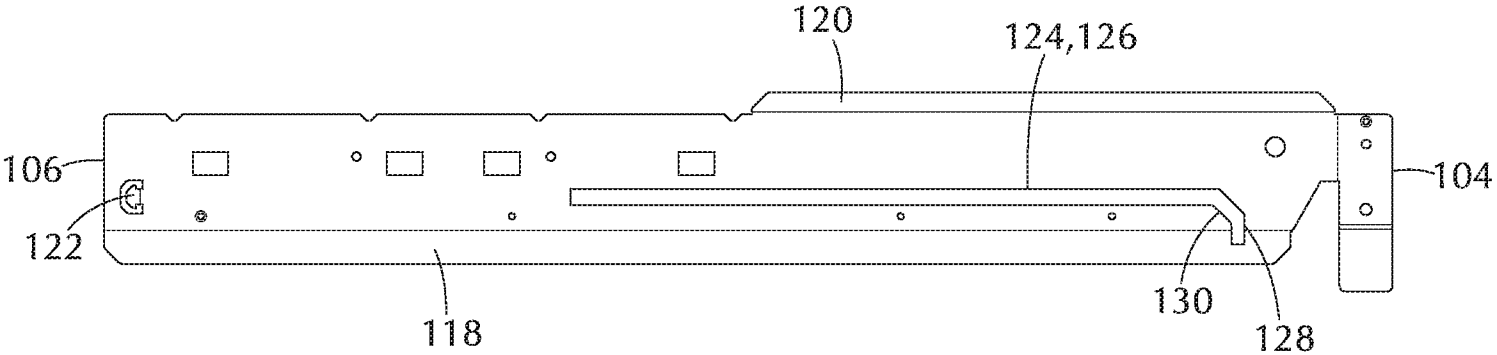

Referring to FIGS. 19 and 20, in an embodiment, the trim mounting mechanism can include a number of sheet metal springs 350 projecting downwardly and radially outwardly from a top of the trim element 374 and extending below the top portion 380 of the lower exterior wall 378 into the gap between the exterior wall 378 and the upper exterior wall 382, and adapted to contact the interior wall 90 of the collar 36 and to removably, frictionally retain the trim element 374 within the collar 36.

Referring to FIGS. 21-35, in an embodiment, the hanger bars 18 provide toolless mounting and precise positioning of the lighting fixture 12 on the grid of rails 20. Each of the two hanger bars 18 preferably comprises two identical hanger bar members 100 that toollessly interconnect to form a single rigid hanger bar 18 for supporting the lighting fixture 12. Each hanger bar member 100 preferably has an elongated section 102 extending along a lengthwise axis (e.g., longitudinal, parallel to the Y axis) between first and second opposed ends 104, 106 of the hanger bar member 100, and has a mounting clip [108] *110* disposed at the first end for connection to a rail 20.

The elongated section 102 includes a vertical portion 112 having front and rear opposed faces 114, 116, and has a horizontal bottom flange 118 which extends laterally from a bottom of the front face 114 of the vertical portion, along the length of the elongated section. The bottom flange 118 provides rigidity to the hanger bar member 100, and as discussed below, is involved in interconnecting the hanger bar members. The elongated section 102 can also include a horizontal top flange 120 which extends laterally from a top of the front face 114 of the vertical portion 102, along a part of the elongated section 102.

Each hanger bar member 100 includes a projection 122 extending laterally outwardly from the rear face 116 of the vertical portion 102, adjacent the second end 106 of the hanger bar member 100. A slot 124 is formed in the hanger bar member 100 for receiving the projection 122 of a second hanger bar member for interconnecting hanger bar members. The slot 124 has a horizontal portion 126 disposed in an intermediate section of the vertical portion 112 of the elongated section 102 of the hanger bar, which extends along the length of the hanger bar, parallel to the lengthwise axis (Y axis) from adjacent the first end 104 toward the second end 106, along a substantial length of the elongated section 102. The slot 124 also has an entry portion 128 disposed in the bottom flange 118 adjacent the first end 104 of the elongated section 102, which extends horizontally perpendicular from the vertical portion 102 of the elongated section of the hanger bar. The slot 124 also has a transition portion 130 in the vertical portion 112 of the elongated section 102, which is aligned at an angle relative to the horizontal portion 126 and interconnects the entry portion 128 and the horizontal portion 126 to form a contiguous slot 124. The entry portion 128 forms a first end of the slot 124 and the horizontal portion 126 forms a second end of the slot.

Each projection 122 includes vertically-aligned head and neck portions 132, 134. The neck portion 134 is relatively narrow and has a vertical dimension less than that of the horizontal portion 126 of the slot 124 and is adapted to freely move within the horizontal portion of the slot. The head portion 132 is relatively enlarged and has a vertical dimension greater than that of the horizontal portion 126 and is adapted to prevent the projection 122 from disengaging with the horizontal portion 126 of the slot. The length of the entry portion 128 of the slot 124, as measured horizontally perpendicular to the vertical portion 112 of the elongated section 102, is sufficient to accommodate the projection 122, and in particular the length is greater than a corresponding maximum horizontal dimension of the projection 122 such that the entry portion 128 is configured to receive the projection 122 therein.

In an embodiment (See FIG. 29), each hanger bar member 100 can be substantially formed from the same piece of material, for example from a single piece of sheet metal which is stamped and folded to form the features disclosed herein. The hanger bar member 100 can be formed primarily from a section of sheet metal having appropriate cut outs and folds.

Figure 30:
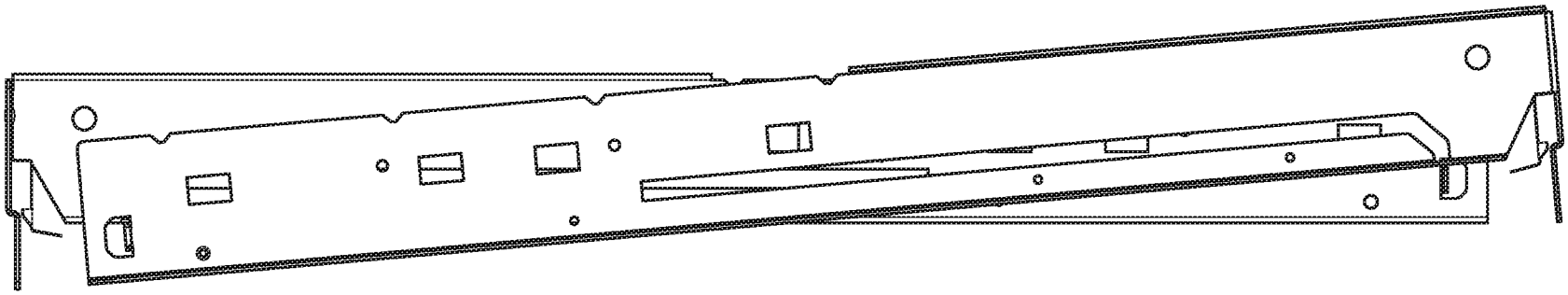
Figure 31:
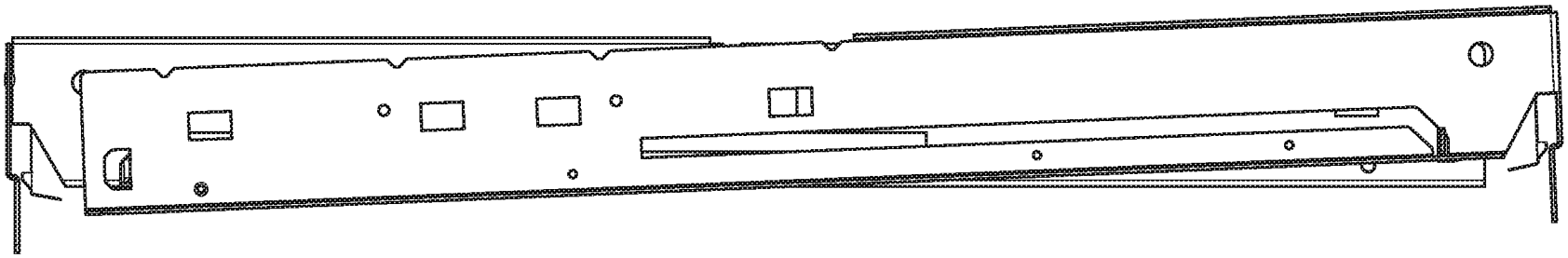
Figure 32:
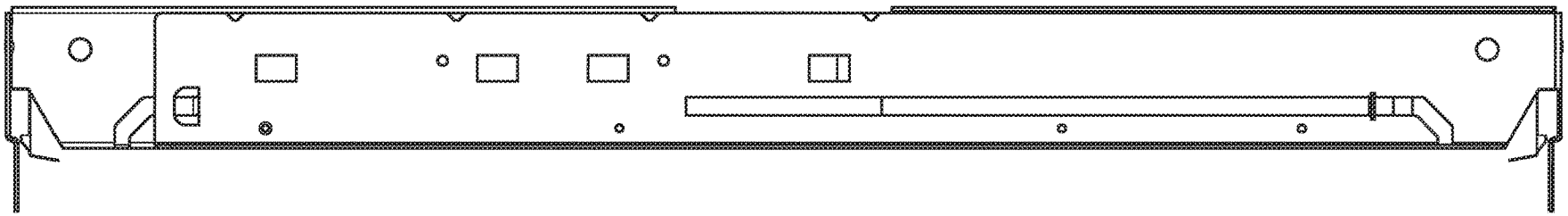
Figure 33:
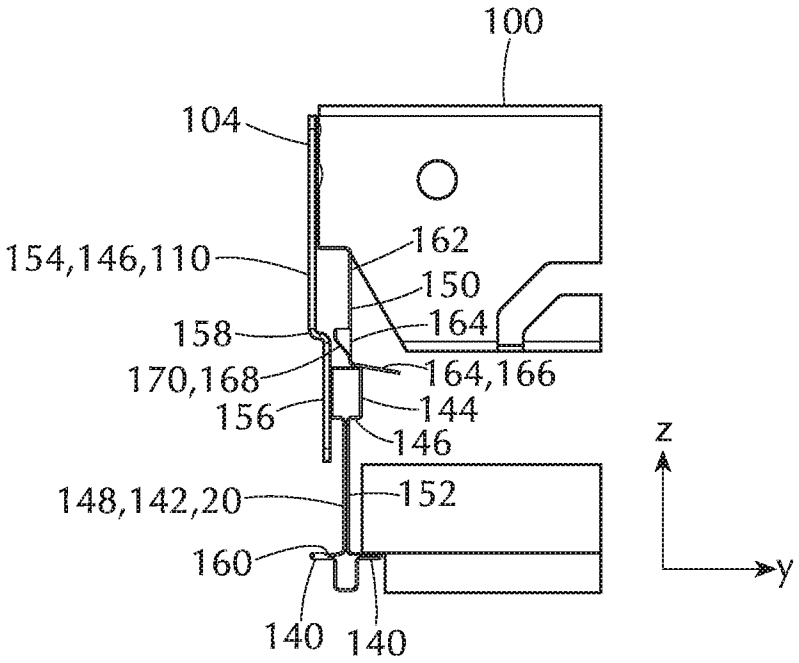
Figure 34:
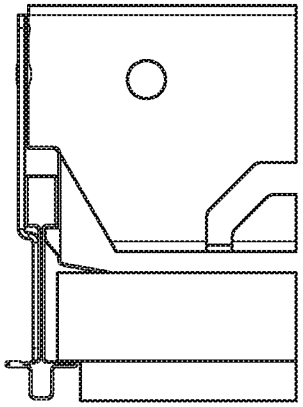
Figure 35:
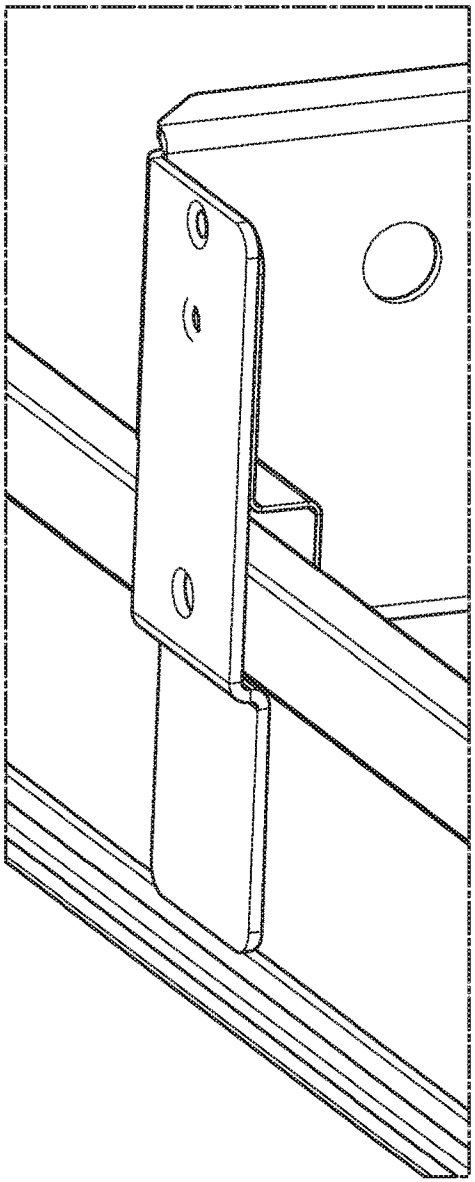
Figure 36:
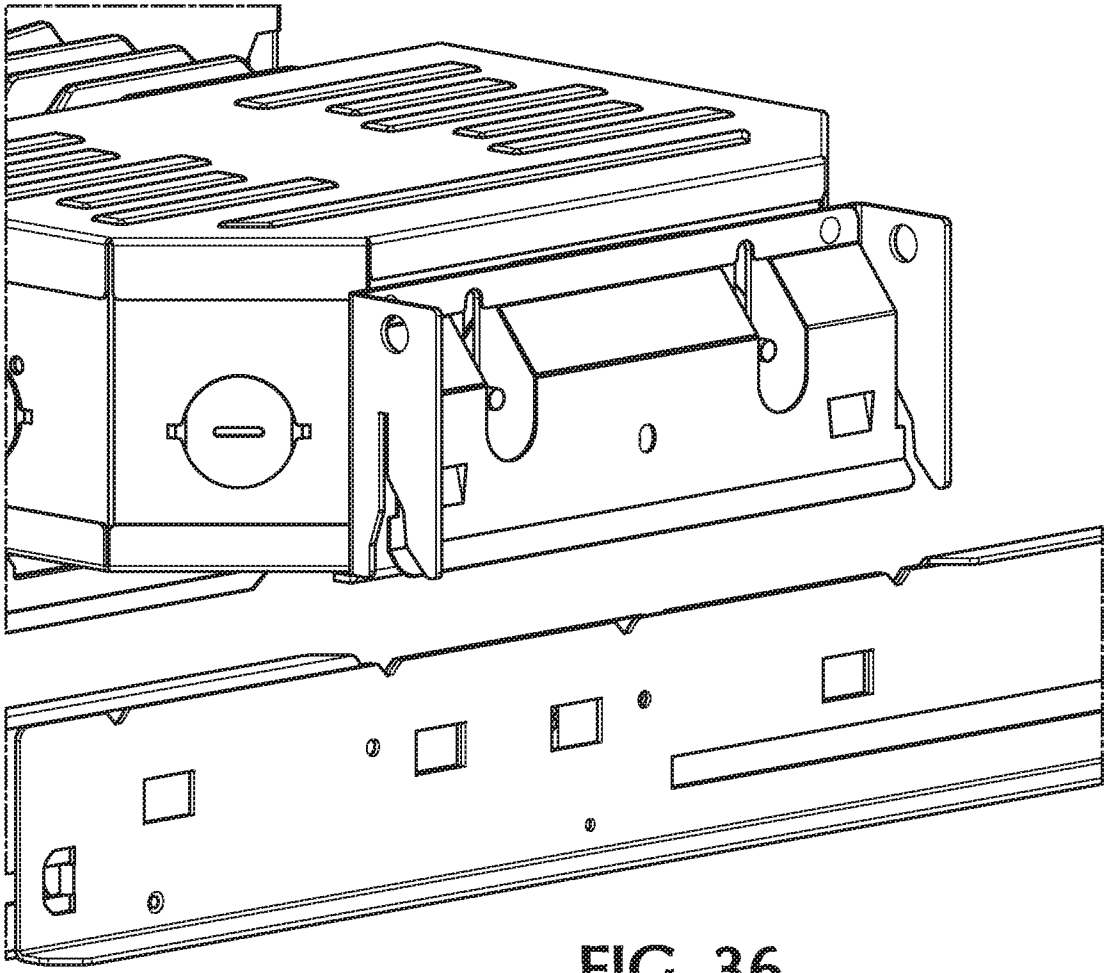
FIGS. 36-43 are views of an embodiment of the mounting bracket of the lighting system.
Figure 37:
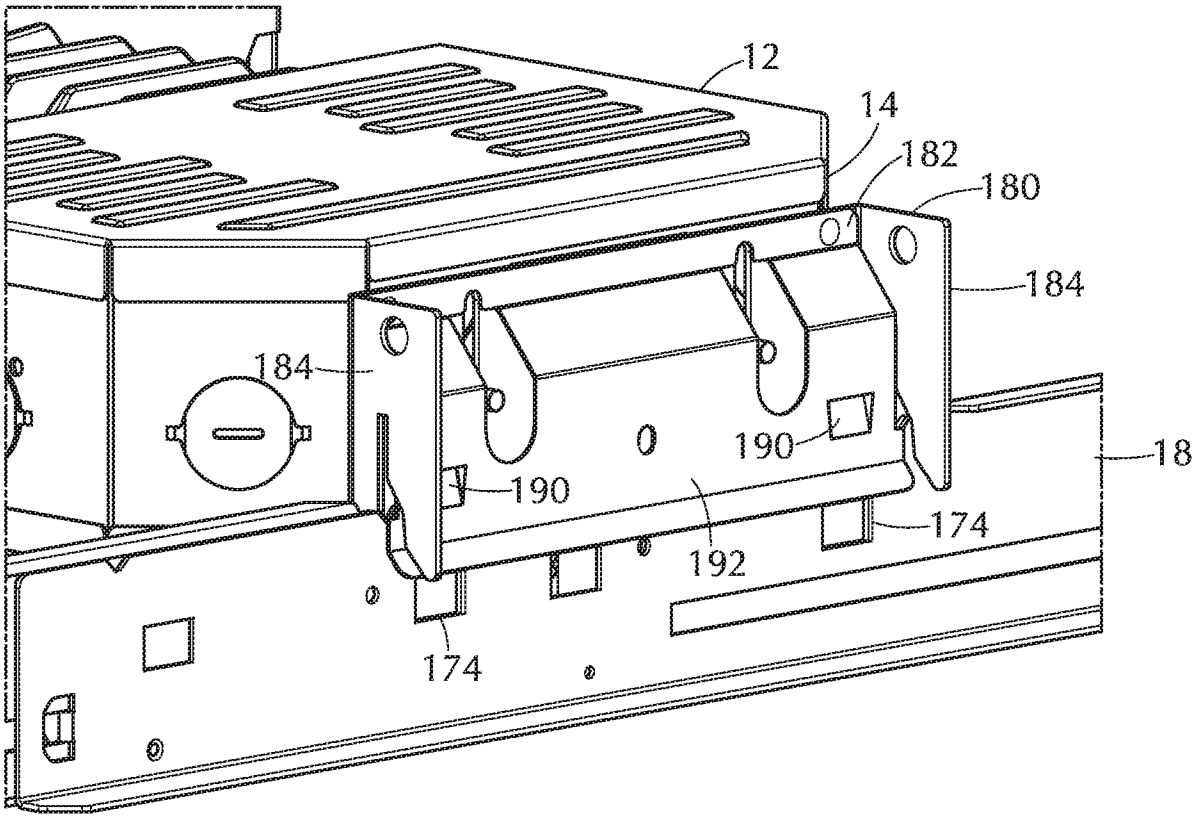
Figure 38:
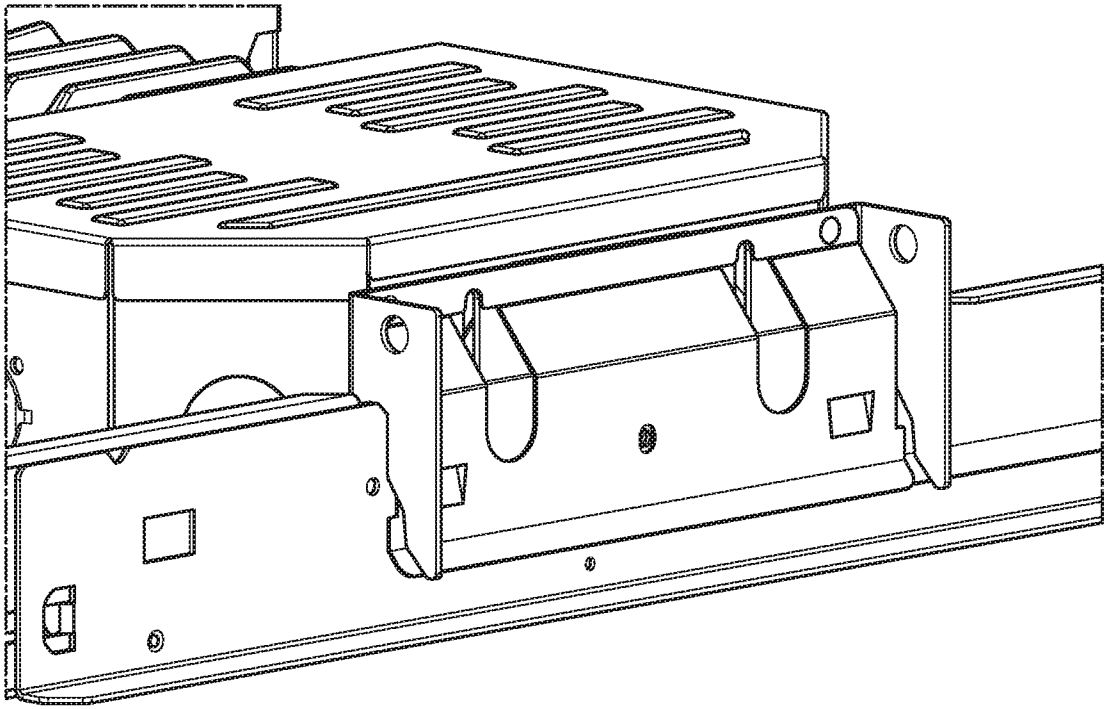
Figure 39:
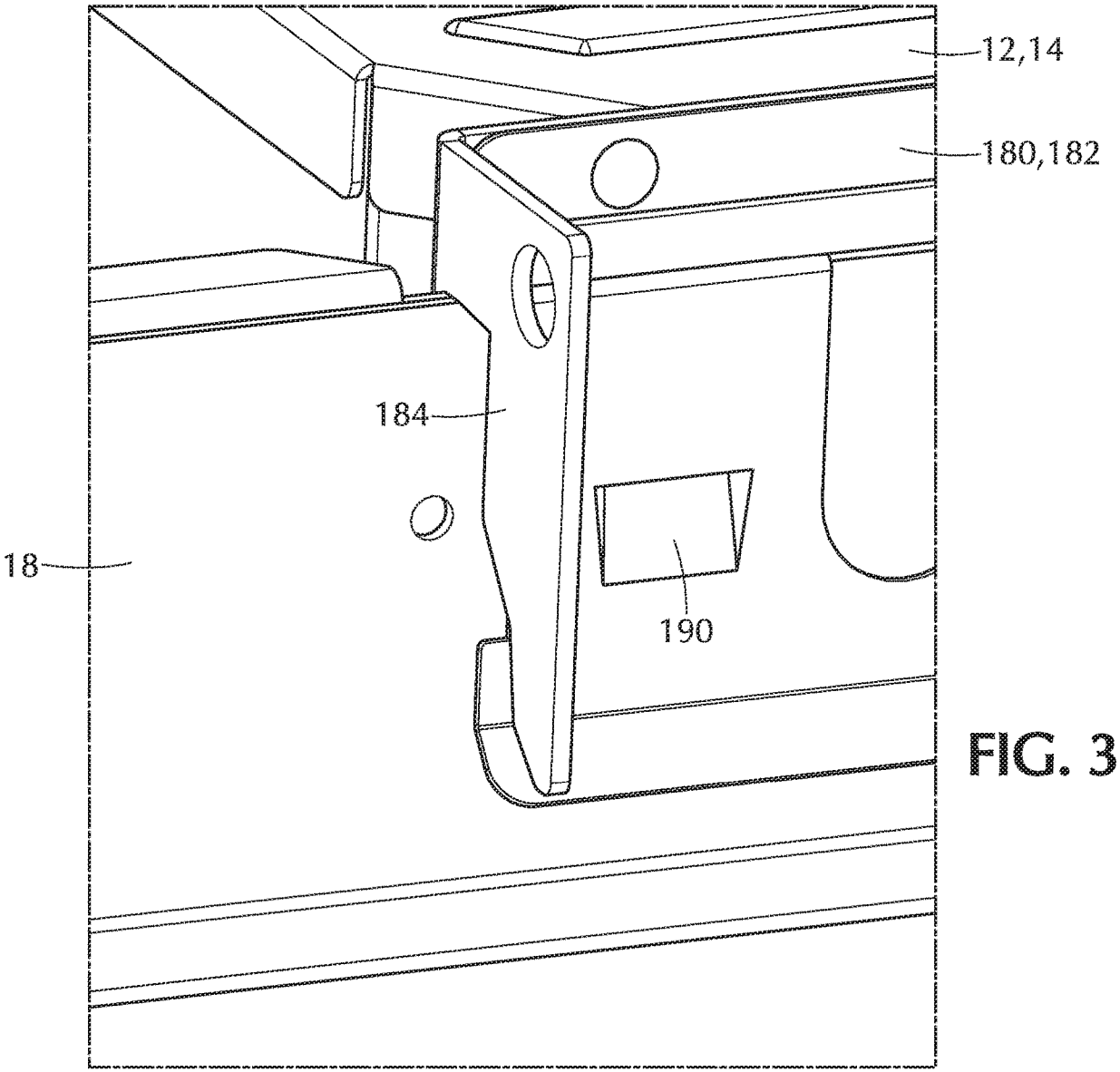
Figure 40:
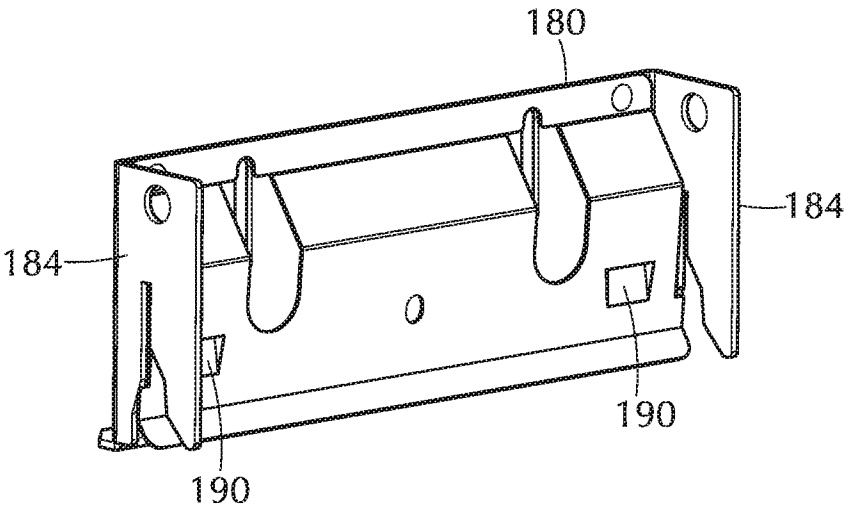
Figure 41:
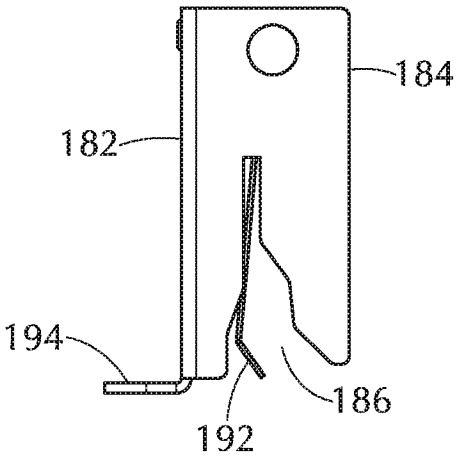
Figure 42:
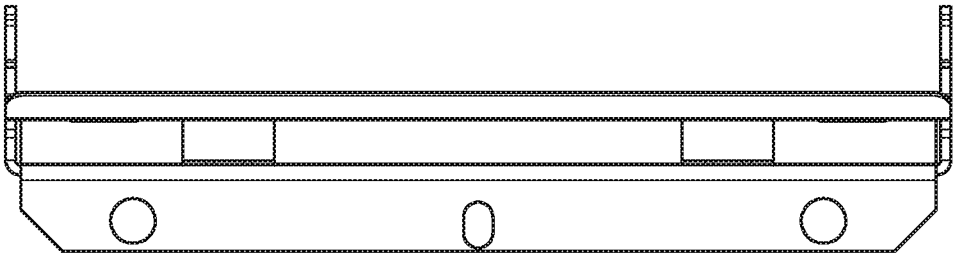
Figure 43:
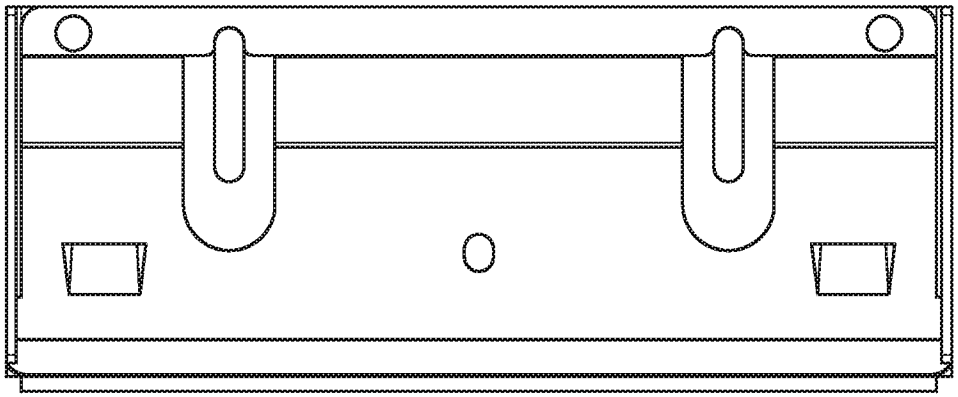
Figure 44:
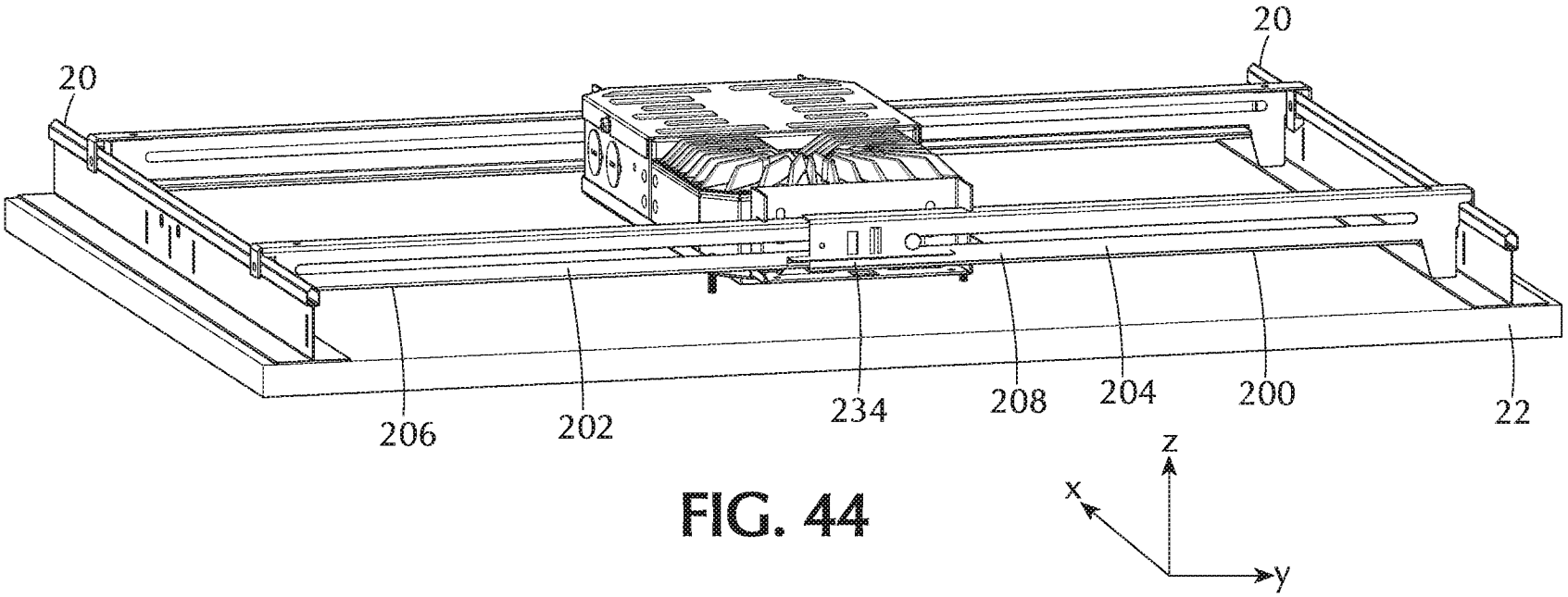
FIG. 44 is a perspective view of an embodiment of the lighting system.
Figure 45:
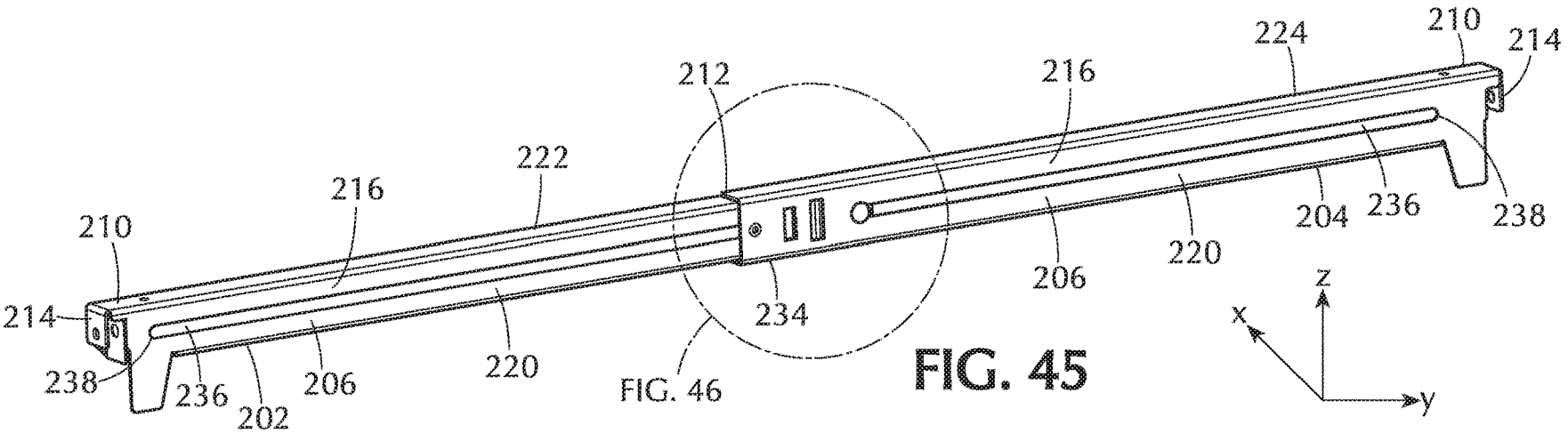
Figure 46:
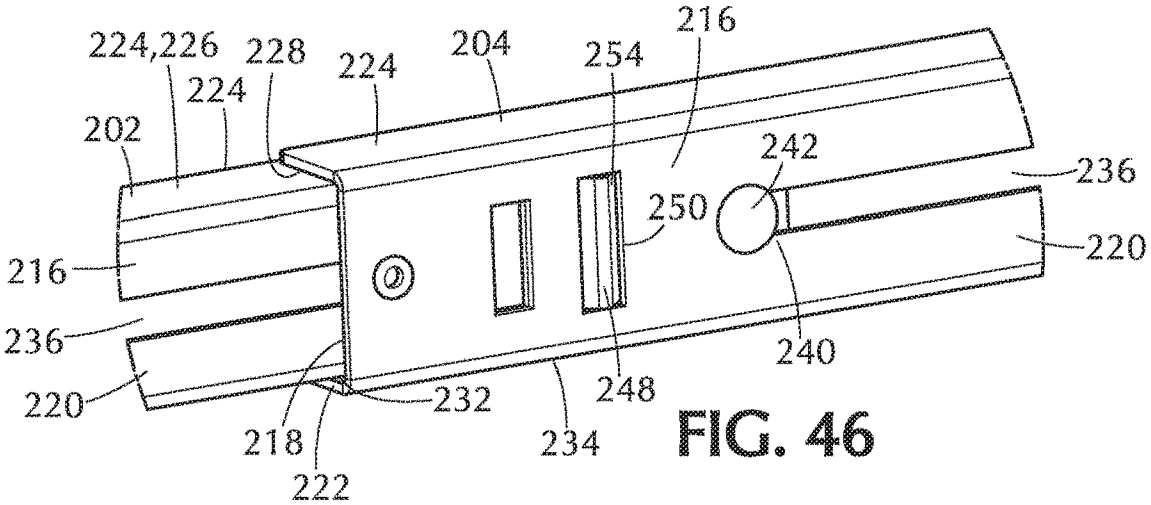
Figure 47:
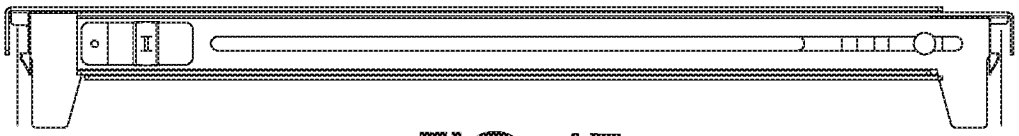
Figure 48A:
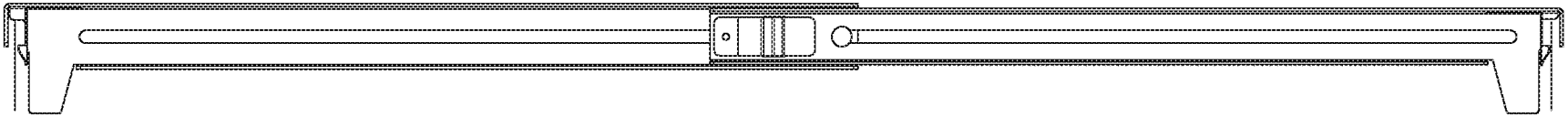
Figure 48B:
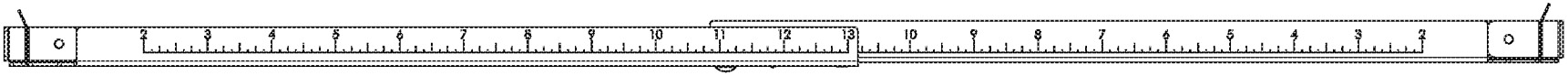
Figure 50:
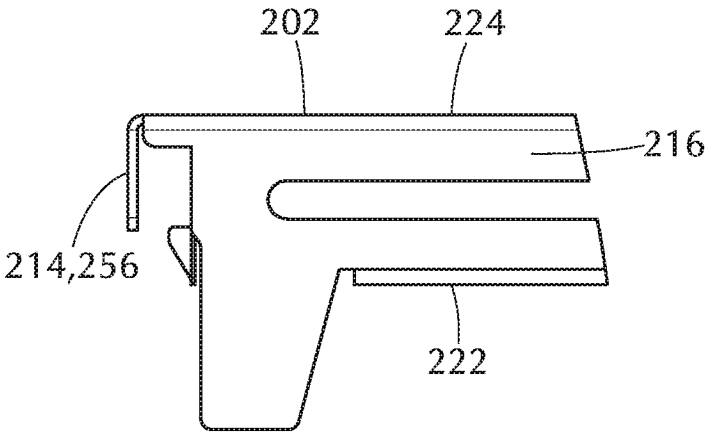
Figure 49:
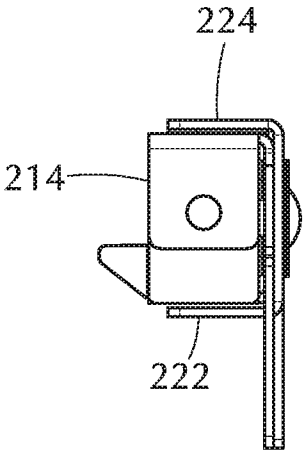
Figure 53:
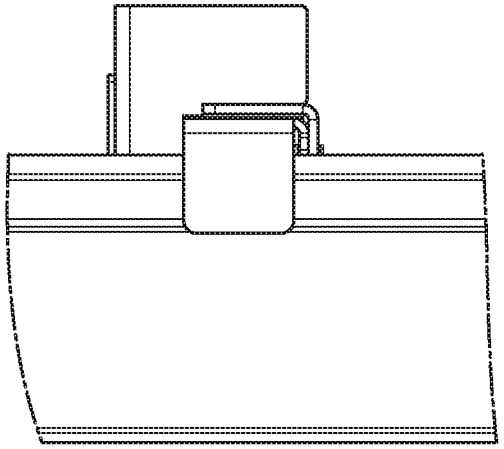
Figure 51:
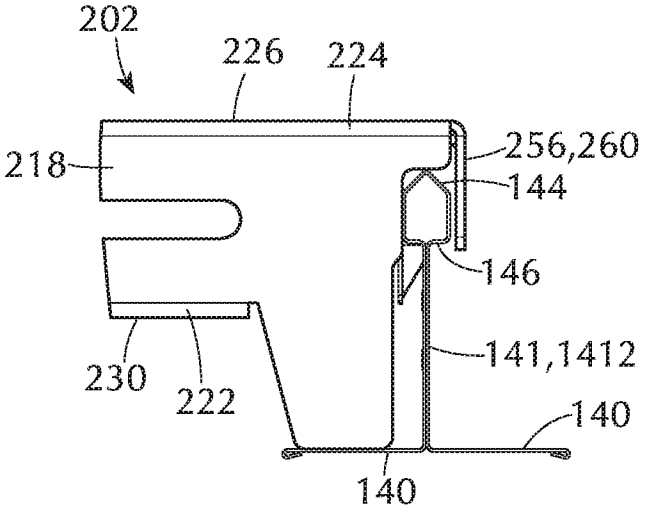
Figure 52:
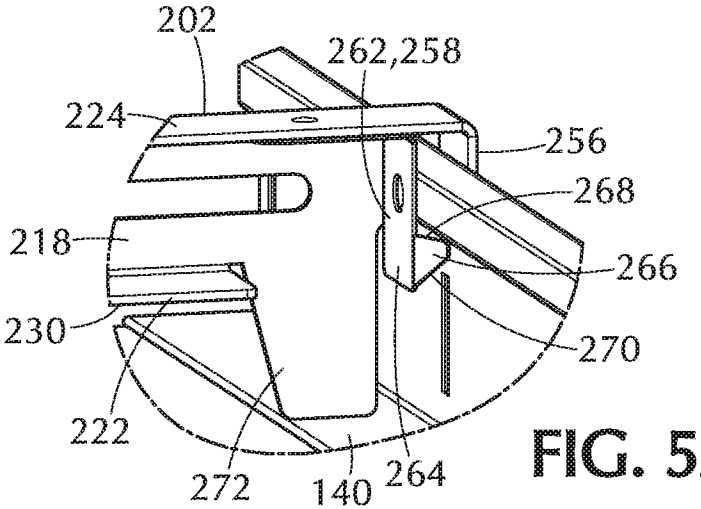
Figure 54:
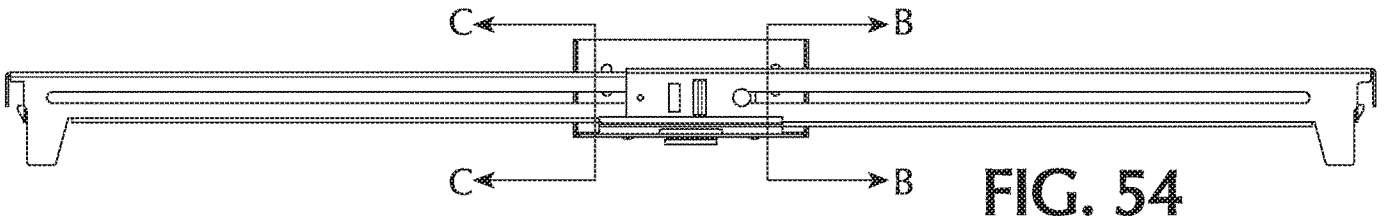

Referring to FIGS. 30-32, in an embodiment, to form a hanger bar 18 from two to hanger bar members 100, the hanger bar members 100 are arranged in a reversed orientation (i.e., rotated 180 degrees about a vertical axis (e.g., parallel to Z axis) with the rear faces 116 of the hanger bar members 100 in an abutting relationship and aligned such that the projection 122 of each hanger bar member enters the entry portion 128 of the slot 124 of the other hanger bar member. As depicted, this can be accomplished by initially relatively rotating the hanger bar members 100 slightly about a horizontal axis (e.g., parallel to X axis) perpendicular to the front and rear faces. In this orientation, the projections 122 can enter the entry portions 128 of the slot 124 of the other hanger bar member 100 and the hanger bar members can be relatively extended in a lengthwise direction (e.g., parallel to Y axis) in a telescoping manner which causes each projection 122 to pass through the transition portion 130 and into the horizontal section 126 of the slot 124 of the opposed hanger bar member. Then, as each projection 122 enters the horizontal portion 126 of the slot 124, the hanger bar members 100 can be further extended in linear manner to a desired length.

Referring to FIGS. 3-35, in an embodiment, the mounting clip 110 of each hanger bar member 100 is adapted to toollessly mount to a rail 20 from above, where the rail is of the type having opposed, laterally extending, horizontal flanges 140 for supporting ceiling panels, and a vertical portion 141 extending upwardly from the horizontal flanges 140. The vertical portion 141 of the rail 20 includes a relatively wide head 144 and a relatively narrow web 142 below the head, with a horizontal step 146 transitioning between the web 142 and head 144. The mounting clip 110 is operable to engage opposing sides of the vertical portion 141 of a rail 20 and to resiliently expand laterally during mounting of the light fixture 122 onto the rail 20.

The mounting clip 110 includes a first portion 146 adapted to be disposed adjacent and to abut a first side 148 of the vertical portion 141 of the rail 20 and a second portion 150 adapted to be disposed adjacent and to abut a second side 152 of the vertical portion 141 of the rail 20, opposite the first side thereof. The first portion 146 of the mounting clip 110 can have a vertical upper portion 154 and an inwardly-spaced vertical lower portion 156 joined to the upper portion 154 by a horizontal step 158 such that the first portion 146 of the mounting clip 110 has an inside profile generally corresponding to the profile of a side of the rail (or at least a portion of such profile). The step 158 of the first portion 146 is adapted to extend under and engage the step 146 of the rail 20, between the head 144 and web 142 of the rail 20. Further, the vertical lower portion 156 is preferably adapted to contact a top surface 160 of the horizontal flange 140 of the rail 20 to precisely and consistently vertically locate the hanger bar 18 relative to the rail, which in turn, serves to precisely and consistently vertically locate the lighting fixture 12 relative to the ceiling panel 22.

The second portion 150 of the mounting clip 110 can have a vertical upper portion 162 spaced from the upper portion 154 of the first portion 146 a distance corresponding to a lateral thickness of the head 144 of the rail. The second portion 150 of the mounting clip 110 also has a lower portion 164 with a first cam surface 166 angled downwardly and away from the rail (and downwardly and away from the first portion of the mounting clip) which is operable to engage a top of the head 144 of the rail to resiliently expand the mounting clip during mounting onto the rail. The lower portion 164 also has a generally triangular resilient flange 168 extending horizontally laterally inwardly from a vertical side edge thereof. The resilient flange 168 has a horizontal upper edge which is adapted to extend under and engage the step of the rail. The resilient flange 168 has a bottom edge which is angled upwardly and laterally inwardly to provide a second cam surface to assist in mounting the light fixture to the rail. During mounting, the second cam surface 170 causes the resilient flange 168 to deflect laterally outwardly (i.e., away from the first portion 146 of the mounting clip 110) to receive the head 144 of the rail 20 and then to return to engage the step 146 of the rail. Thus, the mounting clip 110 allows the hanger bar 18 to be toollessly mounted to the rail 20 from above by having the mounting clip 110 aligned with the rail 20 and pushing the hanger bar down against the rail until the resilient flange 168 securely engages the rail as described above. The second portion 150 of the mounting clip 110 can have two such resilient flanges extending in opposite directions from opposed vertical side edges thereof.

In an embodiment, each hanger bar member 100 preferably includes at least one pair of mounting holes 172, 172' disposed in the vertical portion 112 of the elongated section 102 and spaced apart a predetermined distance for mounting the lighting fixture 12. When two hanger bar members 100 are interconnected, the hanger bar members are arranged such that one of the pairs of mounting holes 172, 172' are aligned to create a pair of mounting hole passages 174 for mounting the lighting fixture. The pair of mounting hole passages 174 thereby formed is centrally located on the hanger bar 18 (i.e., a midpoint between the passages is centrally located on the lengthwise axis of the hanger bar, e.g., parallel to Y axis) due to the fact that the hanger bar members 100 are identical (and the positions of the mounting holes are therefore the same). Therefore, when the hanger bars 18 are mounted to the rails 20, the pair of mounting hole passages 174 are aligned with a center of the ceiling panel 22 parallel to the Y axis. In addition, preferably no measurement is required to assemble the hanger bar members 100 to the proper length. Preferably, the mounting holes [174] *172* are arranged to align when the combined length of the interconnected hanger bar members reaches a predetermined length, for example 48 in. Thus, the length of the hanger bar 18 can be accurately set without the need for measurement.

Each hanger bar member 100 can include multiple pairs of mounting holes 172, 172' to allow the hanger bar to be arranged at various lengths. For example, each hanger bar member 100 can include two pairs of mounting holes 172, 172' such that the length of the hanger bar 18 can be accurately set to two different predetermined lengths, for example 24 in or 36 in, by respectively aligning a first pair or a second pair of mounting holes 172, 172'. As above, in each case, the pair of mounting holes passages 174 formed is centrally located on the hanger bar 18. The hanger bar members 100 can include detents and associated recesses located to engage when the hanger bar members are in the proper position, with an associated pair of mounting holes 172, 172' in alignment.

Referring to FIGS. 36-43, in an embodiment, the mounting brackets 180 are affixed to opposed ends of the housing 14 of the lighting fixture 12 (i.e., opposite ends of the housing, which fall on opposite sides of a first center line of the housing parallel to the Y axis) and which are bisected by a second center line of the housing parallel to the X axis. Further, the mounting brackets 180 are preferably centrally aligned with (and bisected by) the second center line of the housing. Each mounting bracket 180 is adapted to toollessly mount to a hanger bar 18 and to precisely align the lighting fixture 12 relative to the hanger bar. Each mounting bracket 180 preferably includes a substantially vertical base portion 182 affixed to the housing of the lighting fixture and a pair of opposed, vertical, spaced-apart, parallel flanges 184 extending from the base portion 182, where the flanges are aligned perpendicular to the vertical portion of the hanger bar members. Each flange has a slot 186 with an open bottom such that the lighting fixture can be mounted to the hanger bar from above. The slot 186 has a closed top which engages a top of the hanger bar 18 to precisely locate the lighting fixture 12 vertically (e.g., parallel to Z axis) relative to the hanger bar 18. The slot 186 is sized and shaped to closely abut the sides of the hanger bar (i.e., the front faces 114 of the interconnected hanger bar members 100) to precisely locate the lighting fixture laterally (e.g., parallel to X axis) relative to the hanger bar 18.

The hanger bar members 100 can include a pair of recesses 188, 188' associated with each pair of mounting holes 172, 172', which are aligned to receive the top of the slot 186 of the flanges 184 of the mounting bracket 180 to assist and ensure proper alignment of the mounting bracket with respect to the hanger bar.

In addition, each mounting bracket 180 includes a pair of resilient tabs 190 sized and shaped (and spaced) to engage the mounting hole passages 174 formed in the hanger bar. Preferably, the resilient tabs 190 are adapted to resiliently deflect over a top portion of the hanger bar 18 during engagement of the mounting bracket 180 and to enter the mounting hole passages 174 when the mounting bracket 180 is fully mounted to the hanger bar 18. In this manner, the lighting fixture 12 is precisely located relative to the hanger bar 18 in a longitudinal direction (e.g., parallel to Y axis), preferably in the center thereof. In addition, when connected, the resilient tabs 190 resist upward movement of the mounting bracket 180 relative to the hanger bar 18 and thereby provide a secure connection between the light fixture 12 and the hanger bar. The connection can be optionally enhanced with a mechanical fastener (such as a screw) directed through the mounting bracket and into the hanger bar.

The resilient tabs can be disposed on a common arm 192 (or individual arms) depending downwardly and outwardly from a top portion of the base of the mounting bracket 180 in a cantilevered fashion such that the arm 192 and resilient tabs 190 contact a side of the hanger bar opposite lighting fixture 12 and such that the arm 192 provides additional resiliency to mount to the hanger bar.

Preferably, the mounting bracket includes an alignment flange 194 extending horizontally laterally (e.g., parallel to X axis) toward the lighting fixture and operable to engage the bottom 34 of the housing 14 of the lighting fixture 12 to precisely and consistently locate the mounting bracket 180 relative to the lighting fixture in a vertical directions (e.g., parallel to Z axis).

The lighting system is designed and adapted such that the collar 36 of the lighting fixture 12 is easily aligned with and inserted into the opening 24 in the ceiling panel 22. In particular, when the assembly of the lighting fixture and hanger bars is initially mounted to the rails 20 (i.e., when the mounting clips 110 of the hanger bars 18 first contact the rails), the center of the collar 36 is automatically aligned with the center of the opening 24 in the ceiling panel 22 parallel to the Y axis. This automatic alignment is due to the configuration and relative central locations of the mounting hole passages 174, mounting bracket 180, housing 14 and collar 36, as discussed above. If adjustment of the center of the collar 36 is required parallel to the X axis, this can be accomplished by sliding the lighting fixture/hanger bar assembly along the rails 20 until the collar 36 begins to enter the opening 24 in the ceiling panel 22. As discussed above, the cover 52 for the collar 36 is adapted to aid in adjusting the position of the lighting fixture during installation. Once the collar 36 is properly aligned with the opening 24 in the ceiling panel 22, the hanger bars 18 can be urged downwardly to engage the mounting clips 110 with the rails 20, such that the collar 36 drops further into the opening 24 in the ceiling panel. At this time, the cover 52 can be removed from within the room below and the trim element 74 can be installed.

Referring to FIGS. 44-62, in another embodiment, the lighting system 10 includes a lighting fixture 12 with a housing 14 enclosing a lighting element (such as an LED lighting element), a lighting driver for driving the lighting element, and a junction box for connecting the lighting fixture to external power and control. The lighting fixture 12 includes a pair of mounting brackets 280 affixed to opposed ends of the housing 14 and each mounting bracket 280 is operable to toollessly mount to one of pair of hanger bars 200. Each hanger bar 200 is adapted to toollessly mount to a pair of opposed rails 20 of the framework, to support the lighting fixture 12 above a ceiling panel 22.

Referring to FIGS. 44-55C, each hanger bar 200 can have a pair of nested, telescoping inner and outer hanger bar members 202, 204 that are interconnected to form a collapsible hanger bar which, when extended, forms a single rigid hanger bar 200 for supporting the lighting fixture 12. As above, the hanger bars 200 provide for toolless mounting and precise positioning of the lighting fixture 12 on the grid of rails 20. In addition, the hanger bars 200 provide for toolless, infinite (and measured) adjustment of the position of the light fixture 12 along the length of the hangar bars, and such adjustment can be made from below the grid of rails, after installation of the light fixture.

Each of the inner and outer hanger bar members 202, 204 preferably has an elongated section 206 extending along a lengthwise axis (e.g., longitudinal, parallel to the Y axis) between first and second opposed ends 210, 212 of the hanger bar member 202, 204, and has a mounting clip 214 disposed at the first end 202 for connection to a rail.

The elongated section 206 includes a vertical portion 216 having front and rear opposed faces 218, 220, a horizontal bottom flange 222 which extends laterally (X axis) toward the light fixture from a bottom of the front face of the vertical portion, along the length of the elongated section, and a horizontal top flange 224 which extends laterally toward the light fixture from a top of the front face 218 of the vertical portion 216, along the length of the elongated section 206, parallel to the bottom flange 222. The vertical portion 216, along with the top and bottom flanges 224, 222 form a substantially C-shaped channel with an opening directed laterally (X axis) toward the light fixture 12.

The inner and outer hanger bar members 202, 204 can be sized and shaped to closely nest such that the vertical portions 216 and the top and bottom flanges 224, 222 respectively closely abut while allowing for relative sliding of the inner and outer hanger bar members for extension and retraction of the hanger bar. In particular, the rear face 220 of the vertical portion 216 of the inner hanger bar member 202 can closely abut the front surface 218 of the vertical portion 216 of the outer hanger bar member 204, a top surface 226 of the top flange 224 of the inner hanger bar member 202 can closely abut a bottom surface 228 of the top flange 224 of the outer hanger bar member 204, and a bottom surface 230 of the bottom flange 222 of the inner hanger bar member 202 can closely abut a top surface 232 of the bottom flange 222 of the outer hanger bar member 204.

The inner and outer hanger bar members 202, 204 overlap in a central (overlapping) portion of the hanger bar 200. In a fully-extended position of the hanger bar 200, the inner and outer hanger bar members 202, 204 overlap in a central (overlapping) *234* portion of the hanger bar having a relatively short length while the inner and outer hanger bar members 202, 204 extend in opposite directions from the central portion along first and second non-overlapping sections of the hanger bar, for a relatively long length.

The vertical portion 216 of each hanger bar member [2020] *202*, 204 includes an elongated slot 236 extending along the length of the elongated section 206 which is terminated by a first stop 238 adjacent the first end 210 of the hanger bar member 202, 204 and a second stop 240 disposed between the first stop 238 and the second end 212 of the hanger bar member 202, 204. Each hanger bar member also includes an interconnecting projection 242 disposed between the second stop 240 and the second end 212 of the hangar bar member which projects through the slot 236 of the complimentary hanger bar member. In the inner hanger bar member 202, the projection 242 projects laterally outwardly from the rear face 220 of the vertical portion 216 (i.e., away from the light fixture), adjacent the second end 212 of the hanger bar member 202. In the outer hanger bar member 204, the projection 242 projects laterally inwardly from the front face 218 of the vertical portion 216 (i.e., toward the light fixture), adjacent the second end 212 of the hanger bar member 204.

Each projection 242 includes a neck (or stem) portion 244 which extends from the hanger bar member 202, 204, through the slot 236 of the complimentary hanger bar member, to an opposite side of the complimentary hanger bar member. The neck portion 244 is relatively narrow and has a vertical dimension less than that of the slot 236 and is adapted to freely move along the length of the slot 236. Each projection also includes a terminating head portion 246 which is relatively enlarged and has a vertical dimension greater than that of the slot 236 and is adapted to prevent the projection 242 from disengaging with the complimentary hanger bar member. The projection 242 is sized and shaped to maintain the closely nested configuration of the inner and outer hanger bar members 202, 204 but without substantial friction therebetween, to provide for smooth manual telescoping of the hanger bar 200. The projection 242 can be in the form of a shoulder rivet which can be affixed during manufacturing of the hanger bar, such as by directing a free end of the neck portion 244 of the rivet through the slot 236 of one of the hanger bar members 202, 204 and attaching it to the complimentary hanger bar member.

In an embodiment, the inner hanger bar member 202 can include a resilient positioning spring 248, which can be connected to front surface 218 of the vertical portion 216, which extends through the vertical portion 216 of the inner hanger bar member 202 and releasably engages a recess 250 (or opening) in the vertical portion 216 of the outer hanger bar member 204 when the inner and outer hanger bar members are at a predetermined relative position, such as a maximum extension position (for example 24 inches), thereby forming a toolless, releasable detent to maintain the hanger bar in the predetermined position. Preferably, the detent includes opposed cam surfaces 252, 254 such that the detent is engaged and disengaged by relative manually extending the hanger bar members to the predetermined position and relatively retracting them from such position. Multiple predetermined positions can be configured, for example by providing several such recesses at desired positions along the outer hanger bar member.

In an embodiment, the mounting clip 214 of each hanger bar member is adapted to toollessly mount to a rail 20 from above, where the rail 20 is of the type having opposed, laterally extending, horizontal flanges 140 for supporting ceiling panels, and a vertical portion 141, *1412* extending upwardly from the horizontal flanges 140. The vertical portion 141, *1412* of the rail 20 includes a relatively wide head 144 and a relatively narrow web 142 below the head, with a horizontal step 146 therebetween. The mounting clip 214 is operable to engage opposing sides of the vertical portion 141, *1412* of a rail 20 and to resiliently expand laterally during mounting of the light fixture/hanger bar assembly onto the rail 20.

The mounting clip 214 includes a first portion 256 adapted to be disposed adjacent and to abut a first side of the vertical portion 141 of the rail and a second portion 258 adapted to be disposed adjacent and to abut a second side of the vertical portion 141 of the rail, opposite the first side thereof. The first portion 256 of the mounting clip 214 can have a vertical upper portion 260 adapted to contact or closely abut a first portion of the head 144 of the rail.

The second portion 258 of the mounting clip 214 can have a vertical upper portion 262 spaced from the upper portion 260 of the first portion 256 a distance corresponding to a lateral thickness of the head 144 of the rail 20. The second portion 258 of the mounting clip 214 also has a lower portion 264 with a generally triangular resilient flange 266 extending horizontally laterally from a vertical side edge thereof (i.e., toward the first portion of the mounting clip). The resilient flange 266 has a horizontal upper edge 268 which is adapted to extend under and engage the step 146 of the rail 20. The resilient flange 266 has a bottom edge 270 which is angled upwardly and laterally toward the first portion 256 of the mounting clip 214 to provide a cam surface to assist in mounting the light fixture to the rail. During mounting, the cam surface causes the resilient flange 266 to deflect and expand laterally (i.e., away from the first portion of the mounting clip) to receive the head 144 of the rail 20 and then to return to engage the step 146 of the rail. Thus, the mounting clip 214 allows the hanger bar to be toollessly mounted to the rail 20 from above by having the mounting clip 214 aligned with the rail and pushing the hanger bar 200 down against the rail 20 until the resilient flange 266 securely engages the rail 20 as described above. The lower portion 264 of the second portion 258 of the mounting clip 214 can have two such resilient flanges extending in opposite directions from opposed vertical side edges thereof.

In an embodiment, each hanger bar member 202, 204 can have a foot 272 having a bottom adapted to contact a top surface of the fixture-side horizontal flange 140 of the rail 20 (i.e., the flange closest to the light fixture) to precisely and consistently vertically locate the hanger bar 200 relative to the rail, which in turn, serves to precisely and consistently vertically locate the lighting fixture relative to the ceiling panel. The foot 272 is disposed adjacent the first end 210 of the hanger bar member 202, 204 and preferably has an outmost edge that is disposed horizontally laterally inwardly from the head 144 of the rail when mounted (i.e., toward the light fixture), such that the foot 272 does not interfere with or contact the rail 20 when mounting the hanger bar 200 to the rail. The foot 272 can be aligned parallel to the longitudinal axis (Y) of the hanger bar.

Other configurations of the inner and outer hanger bar members are also applicable for any embodiment. For example the inner and outer hanger bar members can have a non-closely abutting configuration (e.g., having a space or gap between respective top and/or bottom flanges). As another example, the inner and outer hanger bar members can each have an L-shaped cross section, with the inner hanger bar member lacking a top flange and the outer hanger bar member lacking a bottom flange (or vice versa) such that the assembled hanger bar has a C-shaped cross section. Alternatively, each of the inner and outer hanger bar members can lack one (and the same) top or bottom flange such that the assembled hanger bar has an L-shaped (or inverted L-shaped) cross section. Further alternative configurations are also applicable.

Figure 55A:
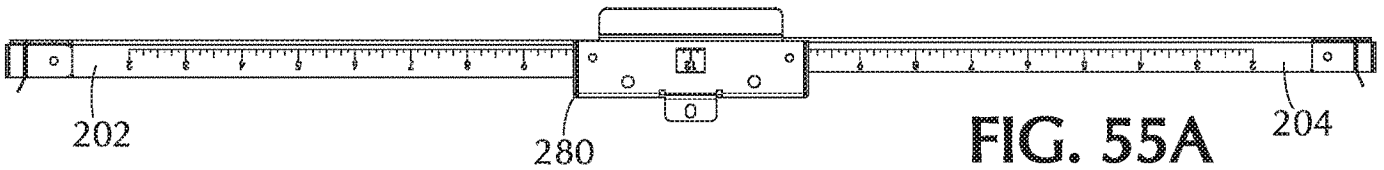

Referring to FIGS. 56-62, in an embodiment, the mounting brackets 280 are affixed to opposite ends of the housing 14 of the lighting fixture 12 and are adapted to removably mount to the hanger bars 200. The mounting brackets 280 also provide for rapid and convenient manual, post-installation adjustment of the position of the light fixture 12 along the length of the hanger bars 200 (i.e., along the Y axis, parallel to a longitudinal axis of the hanger bar), from below the light fixture (and from below the grid of rails). Further, the mounting brackets 280 are configured to provide for such adjustment along the hanger bar 200 while maintaining a consistent (i.e., predetermined) vertical position (height, relative to the Z axis) and lateral position (relative to the X axis) of the light fixture 12 relative to the hanger bar 200 (and rails), including among positions wherein the mounting brackets 280 are in contact (a) solely with the inner hanger bar member 202 (FIG. 55C), (b) solely with the outer hanger bar member 204 (FIG. 55B), and (c) partly with both the inner and outer hanger bar members 202, 204 (i.e., by the overlapping section and/or one of the non-overlapping sections of the hanger bar) (FIG. 55A).

The mounting brackets 280 are affixed to opposed ends of the lighting fixture 12 (i.e., opposite ends of the housing, which fall on opposite sides of a first center line of the housing parallel to the Y axis) and which are bisected by a second center line of the housing parallel to the X axis. Further, the mounting brackets 280 are preferably centrally aligned with (and bisected by) the second center line of the housing. Each mounting bracket 280 is adapted to precisely align the lighting fixture relative to the hanger bar along the vertical axis (Z axis) and along the second center axis of the light fixture (X axis), while allowing for adjustment of the position of the light fixture along the length of the hanger bar, parallel to the first center axis of the of the light fixture (Y axis).

Preferably, the mounting bracket 280 includes an alignment flange 281 extending horizontally laterally (e.g., parallel to X axis) toward the lighting fixture 12 and operable to engage a bottom of the housing 14 of the lighting fixture to precisely and consistently locate the mounting bracket 280 relative to the lighting fixture 12 in a vertical directions (e.g., parallel to Z axis).

Each mounting bracket 280 preferably includes a substantially vertical base portion 282 aligned parallel to the Y axis and affixed to and abutting and end wall of the housing 14 of the lighting fixture 12, and a pair of opposed, spaced-apart, parallel, vertical flanges 284, *292* extending from the base portion, where the vertical flanges are aligned parallel to the X axis and perpendicular to the vertical portion of the hanger bar members. Each flange 284, *292* has a pair of vertically-spaced, upper and lower slots 286, 288 separated by a tongue portion 290. Each of the upper and lower slots 286, 288 has a closed end 291 and extends to a free edge of the flange. The upper slot 286 is configured to receive the top flanges 224 of the inner and outer hanger bar members 202, 204 and the lower slot 288 is configured to receive the bottom flanges 222 of the inner and outer hanger bar members 202, 204, with the tongue portion 290 extending between the top and bottom flanges 224, 222 of the inner hanger bar member 202.

The upper and lower slots 286, 288 in each vertical flange 284 of the mounting brackets 280 are configured to precisely and consistently align and position the light fixture 12 relative to the vertical axis (Z axis) and lateral axis (X axis) while providing for adjustment of the position of the light fixture 12 along the Y axis, relative to the hanger bars 200 (i.e., along a longitudinal axis of the hanger bars). The upper slot 286 is configured to contact the top flange 224 of one or both of the inner and outer hanger bar members 202, 204 and the lower slot 288 is configured to contact the bottom flange 222 of one or both of the inner and outer hanger bar members 202, 204. In particular, an upper edge 294 of the upper slot 286 is configured to contact a top surface of the top flange 224 of the outer hanger bar member 204 and a lower edge 296 is configured to contact a bottom surface of the top flange 224 of the inner hanger bracket member 202, while [an] *a* lower edge [298] *300* of the lower slot 288 is configured to contact a bottom surface of the bottom flange 222 of the outer hanger bar member 204 and an upper edge [300] *298* is configured to contact a top surface of the bottom flange 224 of the inner hanger bracket member 202.

The closed end 291 of each slot 286, 288 is configured to closely abut the free ends of the upper and lower flanges 224, 222 of at least one or both of the upper and lower hanger bar members 202, 204, and to maintain a constant lateral position (along the X axis) of the light fixture relative to the hanger bar 200, regardless of the position of the mounting bracket 280 on the hanger bar 200, including where the mounting bracket 280 is in contact (a) solely with the inner hanger bar member 202 (FIG. 55C), (b) solely with the outer hanger bar member 204 (FIG. 55B), and (c) partly with both the inner and outer hanger bar members 202, 204 (i.e., by the overlapping section and/or one of the non-overlapping sections of the hanger bar) (FIG. 55A).

Each of the upper and lower slots 268, 288 can have a height substantially equal to (or slightly greater than, for example 0.003-0.005 in greater) a combined thickness of the flanges received therein. In particular, the lower slot 288 can have a height substantially equal to the combined thickness of the bottom flanges 222 of the inner and outer hanger bar members 202, 204 and the upper slot 286 can have a height substantially equal to the combined thickness of the top flanges 244 of the inner and outer hanger bar members 202, 204. Thus, the interface of the upper and lower slots 286, 288 with the top and bottom flanges 244, 222 of the hanger bar members constrains the light fixture relative to the hanger bar vertically (i.e., along the Z axis) and laterally (X axis) while allowing for (sliding) movement of the light fixture relative to the hanger bar in a longitudinal direction (Y axis).

The assembly of the lighting fixture 12 and mounting bracket 28 is mounted to an associated hanger bar 200 laterally, from the side of the hanger bar (i.e., horizontally in the ordinary orientation, parallel to X axis) by directing the upper and lower slots 286, 288 of the mounting bracket 280 over top and bottom flanges 224, 222 of the inner and/or outer hanger bar members, respectively.

The mounting bracket 280 can be mounted to the hanger bar 200 in any position between the feet 272 of the hanger bar 200 (or the mounting clips) including in the central, overlapping section, or along either non-overlapping section, or spanning the junction between the overlapping section and one of the non-overlapping sections. Thus there exist at least five contact connection scenarios including: (1) where both vertical flanges 284 contact the flanges 222, 224 of the inner hanger bar member 202 and not those of the outer hanger bar member 204 (i.e., in a non-overlapping section), (2) where one vertical flange 284 contacts the flanges 222, 224 of the inner hanger bar member 202 while the second vertical flange 284 contacts the flanges 284 of both the inner and outer hanger bar members 202, 204 (i.e., in an overlapping section), (3) where both vertical flanges 284 contact the flanges 222, 224 of both the inner and outer hanger bar members 202, 204, (4) where one vertical flange 284 contacts the flanges 222, 224 of both the inner and outer hanger bar members 202, 204 while the second vertical flange 284 contacts the flanges 222, 224 of the outer hanger bar member 204 (i.e., in a non-overlapping section), and (5) where both vertical flanges 284 contact the flanges 222, 224 of the outer hanger bar member 204 (and not those of the inner hanger bar member).

Due to the configuration of the vertical flanges 284 of the mounting brackets 280, and in particular the configuration of the upper and lower slots 286, 288 formed therein, the light fixture 12 will maintain a constant vertical position (Z axis) and lateral position (X axis) relative to the hanger bars 200, during longitudinal movement of the light fixture (Y axis), including among any of the aforementioned five connection scenarios.

In an embodiment, to removably and toollessly secure the light fixture 12 to a hanger bar 200 and to allow adjustment of the longitudinal position along the hanger bar (Y axis), each mounting bracket 280 preferably includes a resilient spring clip 302 configured to contact the back surface 220 of the inner and outer hanger bar members 202, 204. The spring clip 302 can have a fixed end 303 affixed to a top surface of a horizontal flange 304 of the mounting bracket 280 which extends laterally outwardly from the vertical base 282 (i.e., away from the light fixture), between bottom ends of the vertical flanges 284. The spring clip 302 can extend in a cantilevered manner laterally outwardly and can terminate in a free end forming a gripping portion 306 for manually deflecting the spring clip during mounting of the mounting bracket to the hanger bar and during longitudinal adjustment of the position of the light fixture along the hanger bar.

The spring clip 302 is preferably angled upwardly and laterally outwardly from the fixed end 303 and preferably has an upward step 308 between the fixed end 303 and gripping portion 306 at the free end 303 forming a vertically-aligned catch portion adapted to contact and retain the back surface 220 of the inner and outer hanger bar members 202,

204. The spring clip 302 is biased in a raised position. Pulling downwardly on the gripping portion 306 deflects the spring clip 302 downwardly to allow the mounting bracket 280 to be mounted to the hanger bar 200, or to allow adjustment of the position of the light fixture 12 along the hanger bar 200 once mounted. When the mounting bracket 280 is properly mounted to the hanger bar 200, the spring clip 302 is in a partially downwardly deflected position and the upward bias of the spring clip 302 causes the catch portion to bear with force on back 220 of the hanger bar 200 thereby fixing the position of mounting bracket 280 on the hanger bar 200.

The spring clip 302 can be readily accessed from below the light fixture 12 (and below the grid of rails) to allow adjustment of the position of the light fixture from below. When applying downward force on the gripping portion 306 of the spring clip 302 (for example with the fingers of a hand), a bottom surface of the horizontal flange 304 of the mounting bracket 280 is available as a bearing surface for stabilizing the light fixture 12 with a balancing upward force (for example with the thumb of the same hand) and for adjusting the longitudinal position of the light fixture 12. Thus, the spring clip 302 can be deflected without inducing substantial force or friction between the hanger bar 200 and the mounting bracket 280, and once deflected, the operator will have sufficient grip on the mounting bracket 280 to adjust the longitudinal position of the light fixture 12 along the hanger bar 200. Further, the spring clips 302 of the opposing mounting brackets 280 disposed on either end of the light fixture 12 can be conveniently articulated by one person standing underneath the light fixture 12, using two hands in the above manner, as the opposing mounting brackets 280 (and spring clips 302 thereof) will be in opposing orientations suitable for operation by right and left hands, respectively.

Figure 59:
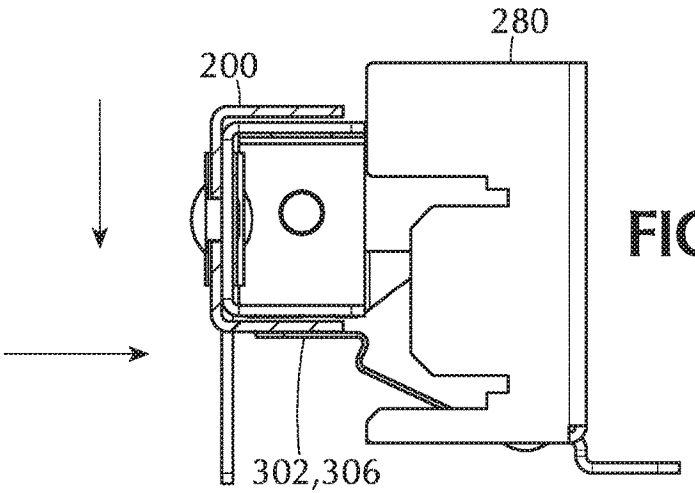
Figure 60:
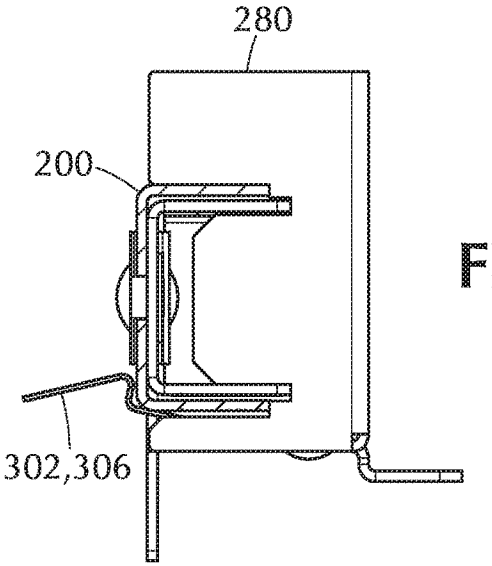
Figure 62:
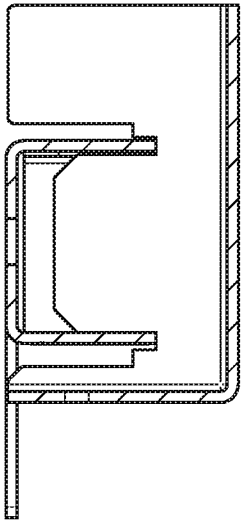
Figure 61:
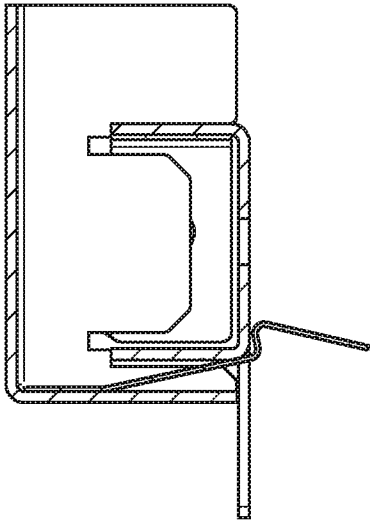

Referring to FIGS. 59 and 60, the gripping portion 306 of the spring clip 302 also provides a bearing surface to engage a bottom of the hanger bar 200 during connection of the mounting bracket 280 to the hanger bar 200. In particular, a bottom of the hanger bar 20 can be urged against the gripping portion 306 to deflect the spring clip 302 downward until a point where the mounting bracket 280 can be connected to the hanger bar 200 as described herein.

Figure 55B:
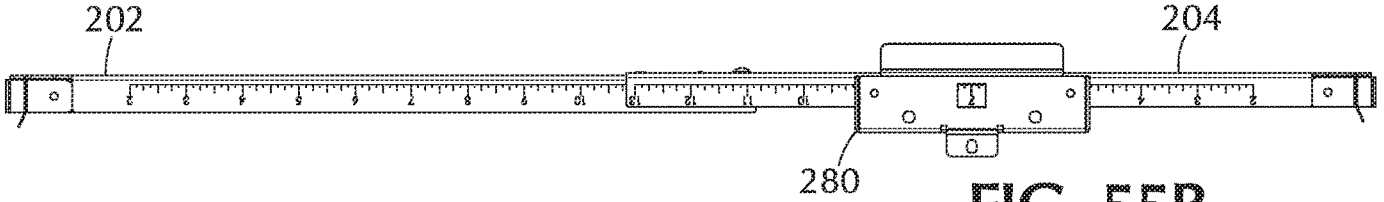
Figure 55C:
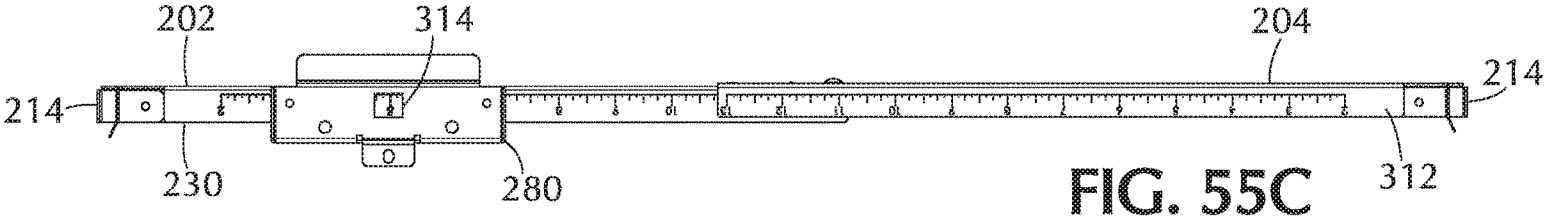
Figure 56:
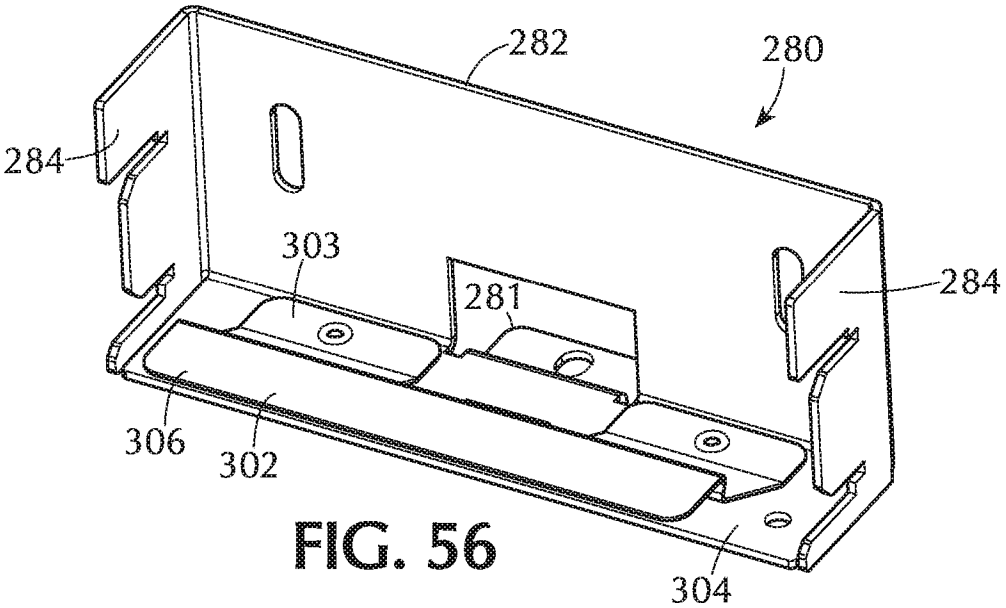
Figure 57:
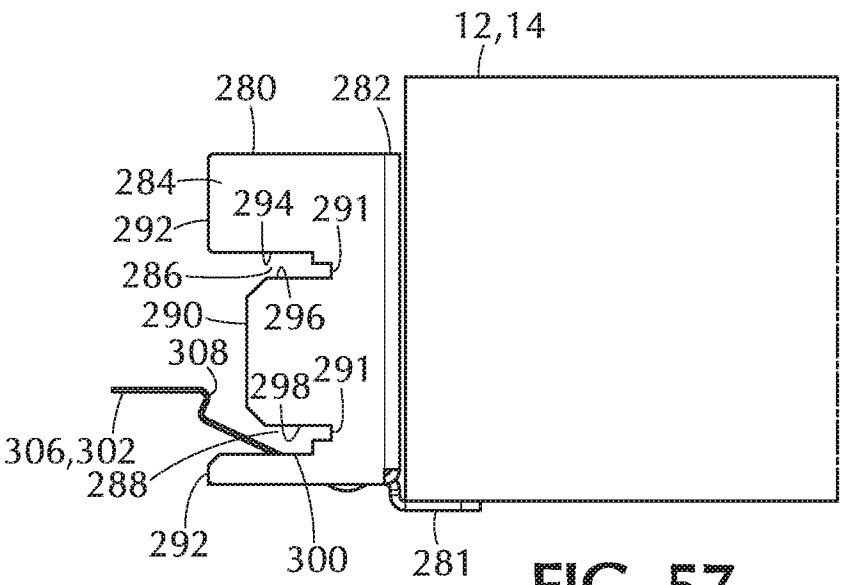
Figure 58:
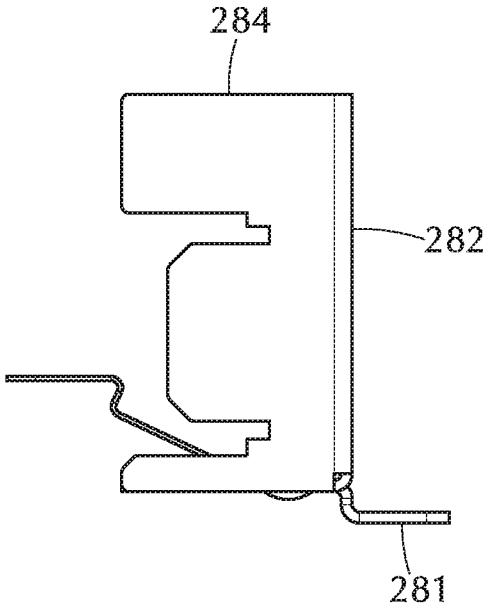

Referring to FIGS. 55A-55C, in an embodiment, each of the inner and outer hanger bar members 202, 204 can include position indicators 310, such as numerical indicators on the bottom surface 230, 312 of the lower flanges 222 thereof, which can indicate a numerical distance from the first end 210 of the hanger bar member 202, 204, such as from the mounting clip 214 thereof, for assisting in positioning the light fixture 12 on the hanger bar 200 (and relative to the grid). The bottom flange 304 of the mounting bracket 280 can include a window 314, preferably in a center thereof in a longitudinal directions (Y axis), adapted for viewing the position indicators 310 therethrough. Thus, the position indicators 310 can be viewed through the window 314, from below the light fixture 12, while adjusting the position of the light fixture 12. The mounting bracket 280 can also include a positioning mark adapted to align with the position indicators 310, to aid in adjusting the position of the light fixture 12.

The spatial orientations used herein, such as horizontal and vertical, are intended to describe relative orientations of the various components in the typical installation where the lighting fixture is installed in a horizontal suspended ceiling. However, it should be appreciated that the lighting fixture can be installed in other orientations.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of this patent.

What is claimed:

1. A recessed light fixture system for a suspended ceiling having a framework for supporting a ceiling structure, the framework including a grid of rails each having opposed horizontal flanges for supporting the ceiling structure and a vertical portion extending upwardly from the horizontal flanges, the lighting fixture system comprising:

a first hanger bar having first and second ends disposed on a longitudinal axis (Y), a center portion between the first and second ends, and a pair of mounting clips disposed on the first and second ends of the first hanger bar, and the *pair of* mounting clips are adapted to toollessly mount to the grid of rails from above the grid of rails;

a light fixture having a housing;

a first mounting bracket affixed to a first end *of* the housing, the first mounting bracket being adapted to toollessly mount to the center portion of the first hanger bar in a [vertical or] lateral direction perpendicular to the longitudinal axis (Y) of the first hanger bar; and means to secure the first mounting bracket to the first hanger bar such that the first mounting bracket is fixed relative to the first hanger bar, the securing means including at least one biased member connected to the first mounting bracket and adapted to releasably and toollessly engage the first hanger bar, and the *at least one* biased member being manually and toollessly operable between biasedly-engaged and disengaged positions*;*

*the first hanger bar comprises first and second hanger bar members which are adapted to relatively move along a longitudinal axis (Y axis) of the first hanger bar to extend and retract a length of the hanger bar;*

*the first and second hanger bar members each have a channel portion including a vertical portion and spaced-apart upper and lower horizontal flanges extending from the vertical portion;*

*the first hanger bar having an overlapping portion where a portion of the channel of the first hanger bar member is nested within a portion of the channel of the second hanger bar member;*

*the first mounting bracket is adapted to mount to the first hanger bar in a horizontal lateral direction (X axis), and when mounted, the first mounting bracket is at a predetermined vertical position (Z axis) and lateral position (X axis) relative to the first hanger bar; and*

*when mounted to the first hanger bar, the first mounting bracket is adapted to slide along a longitudinal length (Y axis) of the first hanger bar from among positions wherein, as to the first hanger bar, the first mounting bracket is in contact with: (a) only the channel of the first hanger bar member, (b) only the channel of the second hanger bar member, and (c) the channels of both of the first and second hanger bar members, while maintaining the predetermined vertical position (Z axis) and lateral position (X axis) relative to the first hanger bar.*

[2. The recessed light fixture system of claim 1, wherein:

the first hanger bar comprises first and second hanger bar members which are adapted to relatively move along a longitudinal axis (Y axis) of the first hanger bar to extend and retract a length of the hanger bar;

the first and second hanger bar members each have a channel portion including a vertical portion and spaced-apart upper and lower horizontal flanges extending from the vertical portion;

the first hanger bar having an overlapping portion where a portion of the channel of the first hanger bar member is nested within a portion of the channel of the second hanger bar member;

the first mounting bracket is adapted to mount to the first hanger bar in a horizontal lateral direction (X axis), and when mounted, the first mounting bracket is at a predetermined vertical position (Z axis) and lateral position (X axis) relative to the first hanger bar;

when mounted to the first hanger bar, the first mounting bracket is adapted to slide along a longitudinal length (Y axis) of the first hanger bar from among positions wherein, as to the first hanger bar, the first mounting bracket is in contact with: (a) only the channel of the first hanger bar member, (b) only the channel the second hanger bar member, and (c) the channels of both of the first and second hanger bar members, while maintaining the predetermined vertical position (Z axis) and lateral position (X axis) relative to the first hanger bar.]

3. The recessed light fixture system of claim [2] *1*, wherein:

the first mounting bracket has upper and lower slots adapted to receive the upper and lower flanges of the first and second hanger bar members, respectively, and the upper and lower slots are configured to maintain the predetermined vertical position (Z axis) and lateral position (X axis) relative to the first hanger bar during sliding movement of the first mounting bracket relative to the first hanger bar.

4. The recessed light fixture system of claim 3, wherein:

the *at least one* biased member of the first mounting bracket comprises a resilient spring clip adapted to contact a rear surface of the first hanger bar such that the first hanger bar is releasably retained between the spring clip and the first mounting bracket.

5. The recessed light fixture system of claim 4 wherein:

the spring clip has a fixed end affixed to the first mounting bracket and extends in a cantilever manner to a free end forming a gripping portion for manually deflecting the spring clip; and the spring clip has a catch portion between the fixed and the free end which is adapted to contact the rear surface of the first hanger bar.

6. The recessed light fixture system of claim 5 wherein:

the spring clip is accessible from below the light fixture to allow adjustment of the position of the light fixture after installation.

7. The recessed light fixture system of claim [2] *1* wherein:

the first hanger bar has position indicators on a bottom surface of the first and second hanger bar members, and the position indicators are adapted to indicate a longitudinal (Y axis) distance from a predetermined point on the first hanger bar; and the first mounting bracket includes a position mark adapted to align with the position indicators to indicate a position of the first mounting bracket relative to the predetermined point.

8. The recessed light fixture system of claim 7 wherein:

a bottom portion of the mounting bracket is disposed below the first hanger bar; and the position mark comprises a window in the bottom portion of the first mounting bracket, and the window is adapted to permit viewing of the position indicators through the window, from below the light fixture.

9. [The recessed light fixture system of claim 1 wherein:] *A recessed light fixture system for a suspended ceiling having a framework for supporting a ceiling structure, the framework including a grid of rails each having opposed horizontal flanges for supporting the ceiling structure and a vertical portion extending upwardly from the horizontal flanges, the lighting fixture system comprising:*

*a first hanger bar having first and second ends disposed on a longitudinal axis (Y), a center portion between the first and second ends, and a pair of mounting clips disposed on the first and second ends of the first hanger bar, and the pair of mounting clips are adapted to toollessly mount to the grid of rails from above the grid of rails;*

*a light fixture having a housing;*

*a first mounting bracket affixed to a first end of the housing, the first mounting bracket being adapted to toollessly mount to the center portion of the first hanger bar in a vertical direction perpendicular to the longitudinal axis (Y) of the first hanger bar; and*

*means to secure the first mounting bracket to the first hanger bar such that the first mounting bracket is fixed relative to the first hanger bar, the securing means including at least one biased member connected to the first mounting bracket and adapted to releasably and toollessly engage the first hanger bar, and the at least one biased member being manually and toollessly operable between biasedly-engaged and disengaged positions;* the first mounting bracket is adapted to mount to the first hanger bar from above, in a vertical direction (Z axis), and when mounted, the first mounting bracket is at a predetermined vertical position (Z axis) and lateral position (X axis) relative to the first hanger bar;

the first hanger bar has a pair of mounting hole passages;

the *at least one* biased member is adapted to contact a rear surface of the first hanger bar such that the first hanger bar is releasably retained between the biased member and the first mounting bracket; *and* the biased member comprises a pair of resilient tabs adapted to engage the pair of mounting hole passages, respectively.

10. The recessed light fixture system of claim 9 wherein:

the first hanger bar has first and second hanger bar members which are adapted to relatively move along a longitudinal axis (Y axis) of the first hanger bar to extend and retract a length of the hanger bar; and the first and second hanger bar members each have a pair of mounting holes adapted to align to form the pair of mounting hole passages; and a length of the first hanger bar being fixed when the *pair of* resilient tabs of the *at least one* biased member engage the *pair of* mounting hole passages.

11. [The recessed light fixture system of claim 1 wherein:] *A recessed light fixture system for a suspended ceiling having a framework for supporting a ceiling structure, the framework including a grid of rails each having opposed horizontal flanges for supporting the ceiling structure and a vertical portion extending upwardly from the horizontal flanges, the lighting fixture system comprising:*

*a first hanger bar having first and second ends disposed on a longitudinal axis (Y), a center portion between the first and second ends, and a pair of mounting clips disposed on the first and second ends of the first hanger bar, and the pair of mounting clips are adapted to toollessly mount to the grid of rails from above the grid of rails;*

*a light fixture having a housing;*

*a first mounting bracket affixed to a first end of the housing, the first mounting bracket being adapted to toollessly mount to the center portion of the first hanger bar in at least one of a vertical or lateral direction perpendicular to the longitudinal axis (Y) of the first hanger bar;*

*means to secure the first mounting bracket to the first hanger bar such that the first mounting bracket is fixed relative to the first hanger bar, the securing means including at least one biased member connected to the first mounting bracket and adapted to releasably and toollessly engage the first hanger bar, and the at least one biased member being manually and toollessly operable between biasedly-engaged and disengaged positions;* the light fixture includes an aperture and a collar depending downwardly from a bottom of the housing and surrounding the aperture;

a trim element is configured to toollessly mount to the collar from below the light fixture;

the trim element having *a* circumferential flange adapted to contact a bottom surface of a ceiling structure surrounding an opening in the ceiling structure; *and* the trim element having a mounting mechanism adapted to bias the trim element upward toward the light fixture to adjust a vertical position of the trim element relative to the light fixture such that the circumferential flange of the trim element is in contact with the bottom surface of the ceiling structure.

12. The recessed light fixture system of claim 11 wherein:

the mounting mechanism of the trim element has a spring element adapted to contact an interior surface of the collar, and the interior surface is angled upward and radially outwardly such that the trim element is biased upward toward the light fixture.

13. The recessed light fixture system of claim 11 wherein:

the collar has an outside wall and has a circumferential notch on an outer surface of the outside wall;

the trim element has an exterior wall which overlaps the outside wall of the collar within the circumferential notch thereby creating a light trap to prevent undesirable escape of light into the ceiling structure.

14. The recessed light fixture system of claim 13 wherein:

an aperture cover is adapted to removably mount to the light fixture through the aperture;

the aperture cover has a circumferential wall which engages the circumferential notch of the collar.

15. A recessed light fixture system for a suspended ceiling having a framework for supporting a ceiling structure, the framework including a grid of rails each having opposed horizontal flanges for supporting the ceiling structure and a vertical portion extending upwardly from the horizontal flanges, the lighting fixture system comprising:

a first hanger bar having a pair of mounting clips disposed on first and second ends of the first hanger bar, which are adapted to toollessly mount to the grid of rails from above the grid of rails;

a light fixture having a housing;

a first mounting bracket affixed to a first end *of* the housing, the first mounting bracket being adapted to toollessly mount to the first hanger bar;

means to secure the first mounting bracket to the first hanger bar such that the first mounting bracket is fixed relative to the first hanger bar, the securing means including at least one biased member connected to the first mounting bracket and adapted to releasably and toollessly engage the first hanger bar, and the *at least one* biased member being manually and toollessly operable between engaged and disengaged positions;

the first hanger bar comprises first and second hanger bar members which are adapted to relatively move along a longitudinal axis (Y axis) of the first hanger bar to extend and retract a length of the hanger bar;

the first and second hanger bar members each have a channel portion including a vertical portion and spaced-apart upper and lower horizontal flanges extending from the vertical portion;

the first hanger bar having an overlapping portion where a portion of the channel of the first hanger bar member is nested within a portion of the channel of the second hanger bar member;

the first mounting bracket is adapted to mount to the first hanger bar in a horizontal lateral direction (X axis), and when mounted, the first mounting bracket is at a predetermined vertical position (Z axis) and lateral position (X axis) relative to the first hanger bar; and when mounted to the first hanger bar, the first mounting bracket is adapted to slide along a longitudinal length (Y axis) of the first hanger bar from among positions wherein, as to the first hanger bar, the first mounting bracket is in contact with: (a) only the channel of the first hanger bar member, (b) only the channel *of* the second hanger bar member, and (c) the channels of both of the first and second hanger bar members, while maintaining the predetermined vertical position (Z axis) and lateral position (X axis) relative to the first hanger bar.

16. The recessed light fixture system of claim 15, wherein:

the first mounting bracket has upper and lower slots adapted to receive the upper and lower flanges of the first and second hanger bar members, respectively, and the upper and lower slots are configured to maintain the predetermined vertical position (Z axis) and lateral position (X axis) relative to the first hanger bar during sliding movement of the first mounting bracket relative to the first hanger bar.

17. The recessed light fixture system of claim 16, wherein:

the *at least one* biased member of the first mounting bracket comprises a resilient spring clip adapted to contact a rear surface of the first hanger bar such that the first hanger bar is releasably retained between the spring clip and the first mounting bracket.

18. The recessed light fixture system of claim 17 wherein:

the spring clip has a fixed end affixed to the first mounting bracket and extends in a cantilever manner to a free end forming a gripping portion for manually deflecting the spring clip; and the spring clip has a catch portion between the fixed and the free end which is adapted to contact the rear surface of the first hanger bar.

19. The recessed light fixture system of claim 18 wherein:

the spring clip is accessible from below the light fixture to allow adjustment of the position of the light fixture after installation.

20. The recessed light fixture system of claim 15 wherein:

the first hanger bar has position indicators on a bottom surface of the first and second hanger bar members, and the position indicators are adapted to indicate a longitudinal (Y axis) distance from a predetermined point on the first hanger bar; and the first mounting bracket includes a position mark adapted to align with the position indicators to indicate a position of the first mounting bracket relative to the predetermined point.

21. The recessed light fixture system of claim 20 wherein:

a bottom portion of the mounting bracket is disposed below the first hanger bar; and the position mark comprises a window in the bottom portion of the first mounting bracket, and the window is adapted to permit viewing of the position indicators through the window, from below the light fixture.

22. [The recessed light fixture system of claim 15 wherein:] *A recessed light fixture system for a suspended ceiling having a framework for supporting a ceiling structure, the framework including a grid of rails each having opposed horizontal flanges for supporting the ceiling structure and a vertical portion extending upwardly from the horizontal flanges, the lighting fixture system comprising:*

*a first hanger bar having first and second ends disposed on a longitudinal axis (Y), a center portion between the first and second ends, and a pair of mounting clips disposed on the first and second ends of the first hanger bar, and the pair of mounting clips are adapted to toollessly mount to the grid of rails from above the grid of rails;*

*a light fixture having a housing;*

*a first mounting bracket affixed to a first end of the housing, the first mounting bracket being adapted to toollessly mount to the center portion of the first hanger bar in a vertical direction perpendicular to the longitudinal axis (Y) of the first hanger bar; and*

*means to secure the first mounting bracket to the first hanger bar such that the first mounting bracket is fixed relative to the first hanger bar, the securing means including at least one biased member connected to the first mounting bracket and adapted to releasably and toollessly engage the first hanger bar, and the at least one biased member being manually and toollessly operable between biasedly-engaged and disengaged positions;* the first mounting bracket is adapted to mount to the first hanger bar from above, in a vertical direction (Z axis), and when mounted, the first mounting bracket is at a predetermined vertical position (Z axis) and lateral position (X axis) relative to the first hanger bar;

the first hanger bar has a pair of mounting hole passages; [and]

the *at least one* biased member is adapted to contact a rear surface of the first hanger bar such that the first hanger bar is releasably retained between the *at least one* biased member and the first mounting bracket; *and* the *at least one* biased member comprises a pair of resilient tabs adapted to engage the pair of mounting hole passages, respectively.

23. The recessed light fixture system of claim 22 wherein:

the first hanger bar has first and second hanger bar members which are adapted to relatively move along a longitudinal axis (Y axis) of the first hanger bar to extend and retract a length of the hanger bar; and the first and second hanger bar members each have a pair of mounting holes adapted to align to form the pair of mounting hole passages; and a length of the first hanger bar being fixed when the *pair of* resilient tabs of the *at least one* biased member engage the *pair of* mounting hole passages.

24. The recessed light fixture system of claim 15 wherein:

the light fixture includes an aperture and a collar depending downwardly from a bottom of the housing and surrounding the aperture;

a trim element is configured to toollessly mount to the collar from below the light fixture;

the trim element having *a* circumferential flange adapted to contact a bottom surface of a ceiling structure surrounding an opening in the ceiling structure; and the trim element having a mounting mechanism adapted to bias the trim element upward toward the light fixture to adjust a vertical position of the trim element relative to the light fixture such that the circumferential flange of the trim element is in contact with the bottom surface of the ceiling structure.

25. The recessed light fixture system of claim 24 wherein:

the mounting mechanism of the trim element has a spring element adapted to contact an interior surface of the collar, and the interior surface is angled upward and radially outwardly such that the trim element is biased upward toward the light fixture.

26. The recessed light fixture system of claim 24 wherein:

the collar has an outside wall and has a circumferential notch on an outer surface of the outside wall; and the trim element has an exterior wall which overlaps the outside wall of the collar within the circumferential notch thereby creating a light trap to prevent undesirable escape of light into the ceiling structure.

27. The recessed light fixture system of claim 26 wherein:

an aperture cover is adapted to removably mount to the light fixture through the aperture; and the aperture cover has a circumferential wall which engages the circumferential notch of the collar.

*28. The recessed light fixture system of claim 22 wherein:*

*the light fixture includes an aperture and a collar depending downwardly from a bottom of the housing and surrounding the aperture;*

*a trim element is configured to toollessly mount to the collar from below the light fixture;*

*the trim element having a circumferential flange adapted to contact a bottom surface of a ceiling structure surrounding an opening in the ceiling structure; and*

*the trim element having a mounting mechanism adapted to bias the trim element upward toward the light fixture to adjust a vertical position of the trim element relative to the light fixture such that the circumferential flange of the trim element is in contact with the bottom surface of the ceiling structure.*

*29. The recessed light fixture system of claim 28 wherein:*

*the mounting mechanism of the trim element has a spring element adapted to contact an interior surface of the collar, and the interior surface is angled upward and radially outwardly such that the trim element is biased upward toward the light fixture.*

*30. The recessed light fixture system of claim 28 wherein:*

*the collar has an outside wall and has a circumferential notch on an outer surface of the outside wall; and*

*the trim element has an exterior wall which overlaps the outside wall of the collar within the circumferential notch thereby creating a light trap to prevent undesirable escape of light into the ceiling structure.*

*31. The recessed light fixture system of claim 30 wherein:*

*an aperture cover is adapted to removably mount to the light fixture through the aperture; and*

*the aperture cover has a circumferential wall which engages the circumferential notch of the collar.*

* * * * *